US012282272B2

(12) United States Patent
Mitsumata et al.

(10) Patent No.: US 12,282,272 B2
(45) Date of Patent: Apr. 22, 2025

(54) IMAGE FORMING APPARATUS AND IMAGE FORMING SYSTEM

(71) Applicant: CANON KABUSHIKI KAISHA, Tokyo (JP)

(72) Inventors: Akinori Mitsumata, Tokyo (JP); Takeo Kawanami, Kanagawa (JP); Shuma Hiasa, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 18/522,050

(22) Filed: Nov. 28, 2023

(65) Prior Publication Data

US 2024/0094658 A1 Mar. 21, 2024

Related U.S. Application Data

(63) Continuation of application No. 17/520,547, filed on Nov. 5, 2021, now Pat. No. 11,841,643.

(30) Foreign Application Priority Data

Nov. 10, 2020 (JP) ................................ 2020-187415

(51) Int. Cl.
*G03G 15/08* (2006.01)

(52) U.S. Cl.
CPC ..... *G03G 15/0879* (2013.01); *G03G 15/0874* (2013.01)

(58) Field of Classification Search
CPC ........... G03G 15/0865; G03G 21/1633; G03G 15/556; G03G 15/0877; G03G 15/0874; G03G 15/0894
See application file for complete search history.

(56) References Cited

U.S. PATENT DOCUMENTS

| | | | | |
|---|---|---|---|---|
| 5,619,239 | A | 4/1997 | Kotaki | |
| 6,212,338 | B1 | 4/2001 | Hagihara | |
| 2002/0181969 | A1 | 12/2002 | Terada | |
| 2006/0228127 | A1* | 10/2006 | Miyabe | G03G 21/1652 399/90 |
| 2008/0112731 | A1 | 5/2008 | Aimoto | |
| 2008/0292355 | A1 | 11/2008 | Sakurai | |
| 2014/0227008 | A1* | 8/2014 | Janssen | G03G 15/0894 399/258 |
| 2015/0261181 | A1 | 9/2015 | Moon | |
| 2017/0277119 | A1* | 9/2017 | Sakai | G03G 21/1885 |

(Continued)

FOREIGN PATENT DOCUMENTS

| | | | |
|---|---|---|---|
| CN | 1313193 | A | 9/2001 |
| CN | 101017349 | A | 8/2007 |
| CN | 101542398 | A | 9/2009 |

(Continued)

*Primary Examiner* — Jessica L Eley
(74) *Attorney, Agent, or Firm* — Canon U.S.A., Inc., IP Division

(57) ABSTRACT

An image forming apparatus which can be replenished with toner using a replenishment cartridge and communicates with a memory device of the replenishment cartridge via a first electric contact portion and a second electric contact portion after a replenishment cartridge is attached to the image forming apparatus in an installation portion. The replenishment cartridge is prevented from being detached by a regulation unit when it is in the replenishment position.

8 Claims, 31 Drawing Sheets

(56) References Cited

U.S. PATENT DOCUMENTS

| | | | | |
|---|---|---|---|---|
| 2021/0018859 | A1* | 1/2021 | Fukasawa | G03G 15/0863 |

FOREIGN PATENT DOCUMENTS

| | | | | |
|---|---|---|---|---|
| CN | 107315334 | A | 11/2017 | |
| CN | 109116700 | A | 1/2019 | |
| EP | 0621483 | A1 | 10/1994 | |
| JP | H09185238 | A | 7/1997 | |
| JP | 2003029494 | A | 1/2003 | |
| JP | 2005241868 | A | 9/2005 | |
| JP | 2012014097 | A | 1/2012 | |
| WO | WO-2019152006 | A1 * | 8/2019 | B41J 2/17506 |

* cited by examiner

IMAGE FORMING APPARATUS AND IMAGE FORMING SYSTEM

CROSS-REFERENCE TO RELATED APPLICATIONS

The present application is a continuation of U.S. patent application Ser. No. 17/520,547, filed on Nov. 5, 2021, which claims priority from Japanese Patent Application No. 2020-187415 filed Nov. 10, 2020, which are hereby incorporated by reference herein in their entireties.

BACKGROUND

Field of the Disclosure

The present disclosure relates to an image forming apparatus that forms an image onto a recording material and an image forming system.

Description of the Related Art

In an electrophotographic image forming apparatus, an electrostatic latent image is formed on the surface of a photosensitive drum by a scanner unit, and this electrostatic latent image is developed using toner serving as developer. WO 2020/046338 discusses a configuration that can replenish a developer container with developer from the outside of an apparatus main body by attaching a replenishment cartridge to an image forming apparatus.

SUMMARY

The present disclosure is directed to an aspect of an image forming apparatus and an image forming system.

According to an aspect of the present disclosure, an image forming apparatus to which a replenishment cartridge including a storing unit storing toner and a memory device storing information is attachable, the image forming apparatus includes an installation portion to which the replenishment cartridge is attached, a first electric contact portion provided inside the installation portion and configured to contact a second electric contact portion of the memory device included in the replenishment cartridge in a state where the replenishment cartridge is attached to the installation portion, a regulation unit that includes a movable member movable from a first position to a second position, and is configured to regulate the replenishment cartridge so as not to be detached from the installation portion in a case where the movable member moving is in the second position, and a control unit, wherein the regulation unit regulates the replenishment cartridge so as not to be detached from the installation portion, in a state where the storing unit of the replenishment cartridge extends to an outside of the image forming apparatus, by the movable member moving from the first position to the second position, and wherein the control unit communicates with the memory device via the first electric contact portion and the second electric contact portion after the replenishment cartridge is regulated in the installation portion by the regulation unit.

Further features of the present disclosure will become apparent from the following description of exemplary embodiments with reference to the attached drawings.

DESCRIPTION OF THE EMBODIMENTS

Hereinafter, modes for carrying out the disclosure will be described in detail with reference to the drawings based on exemplary embodiments. The dimensions, materials, shapes, and relative arrangement of the components described in the exemplary embodiments are to be appropriately changed depending on various conditions and the configuration of an apparatus to which the disclosure is applied. In other words, the dimensions, materials, shapes, and relative arrangement of the components are not intended to limit the scope of the disclosure to the following exemplary embodiments.

[Overall Configuration of Image Forming Apparatus]

An overall configuration of an image forming system including an image forming apparatus 1 according to a first exemplary embodiment and a replenishment pack 310 will be described. The image forming apparatus 1 according to the present exemplary embodiment is a monochrome laser printer that uses an electrophotographic process, and forms an image onto a recording material P using developer (toner) in accordance with image information transmitted from an external device such as a personal computer. Examples of the recording material P include recording paper, label paper, an overhead projector (OHP) sheet, and cloth.

In the following description, in a case where the image forming apparatus 1 is installed on a horizontal surface, a height direction of the image forming apparatus 1 (direction opposite to a vertical direction) will be referred to as a Z direction. A direction that intersects the Z direction, and is parallel to a rotational axis direction (main scanning direction) of a photosensitive drum 11 to be described below will be referred to as an X direction. A direction intersecting the X direction and the Z direction will be referred to as a Y direction. Desirably, the X direction, the Y direction, and the Z direction vertically intersect with each other. For the sake of convenience, a plus side and a minus side in the X direction will be referred to as a right side and a left side, respectively, a plus side and a minus side in the Y direction will be referred to as a front side and a back side, respectively, and a plus side and a minus side in the Z direction will be referred to as an upside and a downside, respectively.

Figure 1:
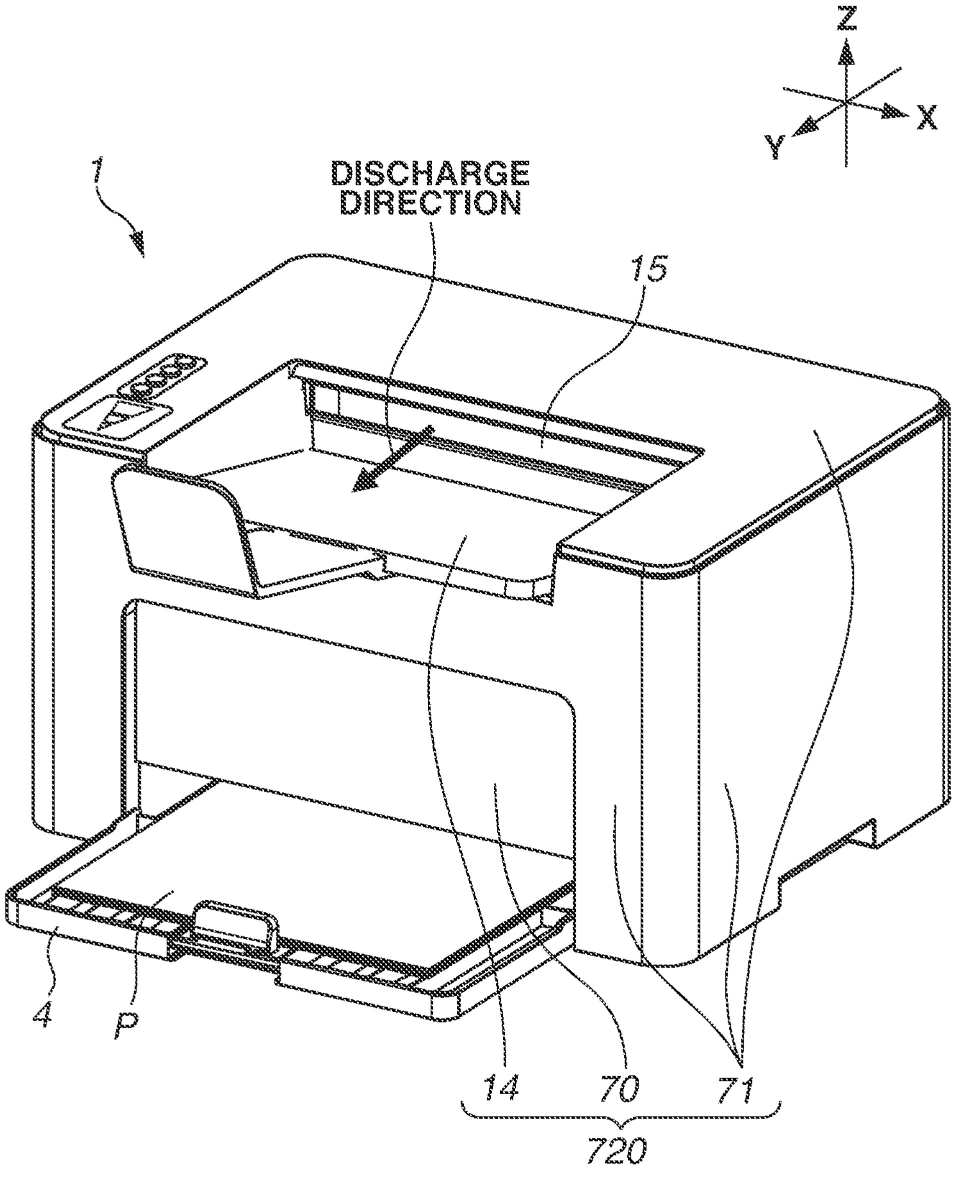
FIG. 1 is a perspective view of an image forming apparatus.
Figure 2:
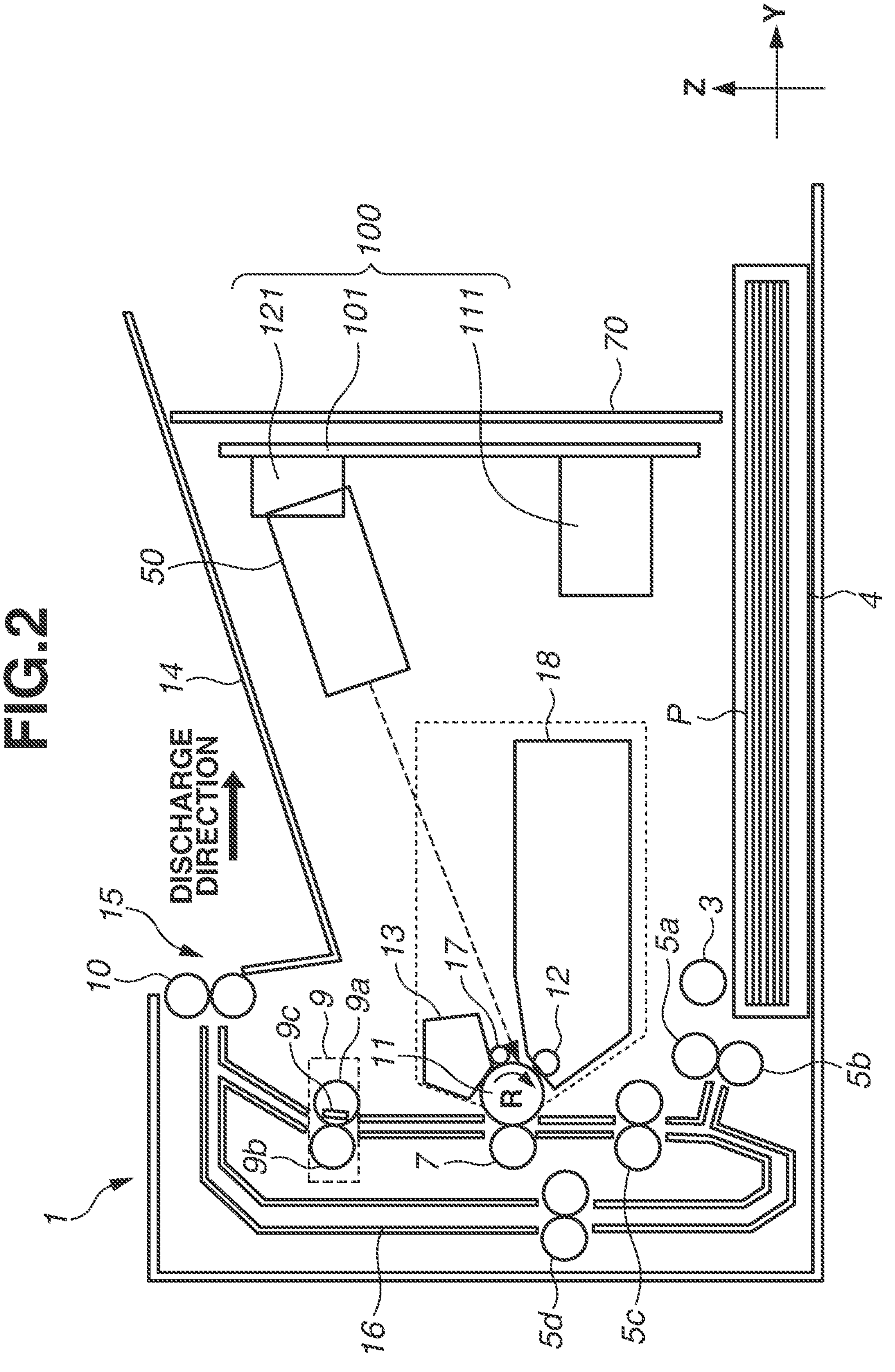
FIG. 2 is a diagram illustrating an internal configuration of the image forming apparatus.

FIG. 1 is a perspective view of the image forming apparatus 1, and FIG. 2 is a diagram illustrating an internal configuration of the image forming apparatus 1 viewed from the X direction (the rotational axis direction of the photosensitive drum 11). FIG. 2 selectively illustrates only members related to an image forming process. In FIG. 1, the image forming apparatus 1 includes a sheet tray 4 in which the recording material P is stored, and a discharge tray 14 on which the discharged recording material P is stacked. The sheet tray 4 can be pulled out in the Y direction, and a user can replenish the sheet tray 4 with the recording materials P. The recording material P that has been fed from the sheet tray 4 and has an image formed thereon is discharged from a discharge port 15 toward a discharge direction (Y direction) illustrated in FIG. 1, and is stacked on the discharge tray 14.

A front cover 70 is provided at a part of an end surface (part of a front surface) of the image forming apparatus 1 on the downstream side in a discharge direction, and covers a circuit substrate 100 to be described below. An exterior cover 71 is provided on a part of the front surface other than a place at which the front cover 70 is provided, and on the side surfaces and the top surface of the image forming apparatus 1. The front cover 70, the exterior cover 71, and the above-described discharge tray 14 form a housing 720 of the image forming apparatus 1. The housing 720 is a member covering the entire image forming apparatus 1, and incorporates a process member such as a scanner unit 50 to be described below. The above-described discharge port 15 is an opening formed on a part of the housing 720, and the recording material P is discharged to the outside of the image forming apparatus 1 through the opening.

A flow of an image forming operation to be performed on the recording material P will be described with reference to FIG. 2. When image information is transmitted to the image forming apparatus 1, based on a print start signal, the photosensitive drum 11 serving as a rotary member is rotationally driven in an arrow R direction at a predetermined circumferential speed (process speed). Based on the input image information, the scanner unit 50 emits laser light onto the photosensitive drum 11. The scanner unit 50 is a unit including a lasing device that outputs laser light, a polygon mirror and a lens for emitting laser light onto the photosensitive drum 11, a scanner motor for rotating the polygon mirror, and a frame integrally supporting these members. The photosensitive drum 11 is preliminarily charged by a charging roller 17, and the emission of laser light forms an electrostatic latent image onto the photosensitive drum 11. Then, the electrostatic latent image is developed by toner stored in a container 18 being carried by a development roller 12 (developer bearing member) to the photosensitive drum 11 (photosensitive member), and a toner image is formed on the photosensitive drum 11.

Concurrently with the above-described image forming process, the recording material P is fed from the sheet tray 4. A pickup roller 3, a feeding roller 5*a*, and a conveyance roller pair 5*c* are provided on a conveyance path of the image forming apparatus 1. By contacting an uppermost recording material P of the recording materials P stored in the sheet tray 4, and rotating, the pickup roller 3 feeds the recording material P. The feeding roller 5*a* and a separation roller 5*b* being in pressure contact with the feeding roller 5*a* form a separation nip. In a case where a plurality of recording materials P is fed to the separation nip due to the influence of frictional force applied between the recording materials P, the feeding roller 5*a* and the separation roller 5*b* separate the plurality of recording materials P, and feed only the uppermost recording material P toward the downstream side.

The recording material P fed from the sheet tray 4 is conveyed by the conveyance roller pair 5*c* toward a transfer roller 7. By a transfer bias being applied to the transfer roller 7, a toner image formed on the photosensitive drum 11 is transferred onto the recording material P. The recording material P having the toner image transferred by the transfer roller 7 is subjected to heating and pressure application processing to be performed by a fixing device 9, and the toner image is fixed onto the recording material P. The fixing device 9 includes a heating roller 9a including a built-in fixing heater 9c, and a pressure application roller 9b pressed toward the heating roller 9a. Then, the recording material P having the fixed toner image is discharged to the discharge tray 14 by a discharging roller pair 10.

In the case of forming images onto both surfaces of the recording material P, by switching back the recording material P having an image formed on the first surface, the discharging roller pair 10 guides the recording material P to a double-sided conveyance path 16.

The recording material P guided to the double-sided conveyance path 16 is conveyed by a double-sided conveyance roller pair 5d again to the transfer roller 7. After an image is formed by the transfer roller 7 on the second surface of the recording material P, the recording material P is discharged by the discharging roller pair 10 to the outside of the apparatus. After the toner image is transferred onto the recording material P, the photosensitive drum 11 is cleaned by a cleaning unit 13 by removing toner remaining on the photosensitive drum 11.

As illustrated in FIG. 2, the image forming apparatus 1 includes the circuit substrate 100. The circuit substrate 100 includes a wiring plate 101 formed of insulating material, and electronic components 111 and 121 soldered to the wiring plate 101. Because conductive wires are laid out inside and on the plate of the wiring plate 101, the electronic components 111 and 121 are electrically connected. The circuit substrate 100 has a function of converting an alternating current supplied from the outside of the image forming apparatus 1, into a direct current, and converting an input voltage for obtaining a predetermined voltage value necessary for an image forming process.

As illustrated in FIG. 2, the circuit substrate 100 is arranged in such a manner that the surface of the wiring plate 101 on which the electronic components 111 and 121 are mounted extends in a direction intersecting the discharge direction. Furthermore, the wiring plate 101 is provided between the front cover 70 and the scanner unit 50 in the discharge direction. The electronic components 111 and 121 are provided on a surface of the wiring plate 101 that faces the scanner unit 50.

[Arrangement of Circuit Substrate]

Figure 3:
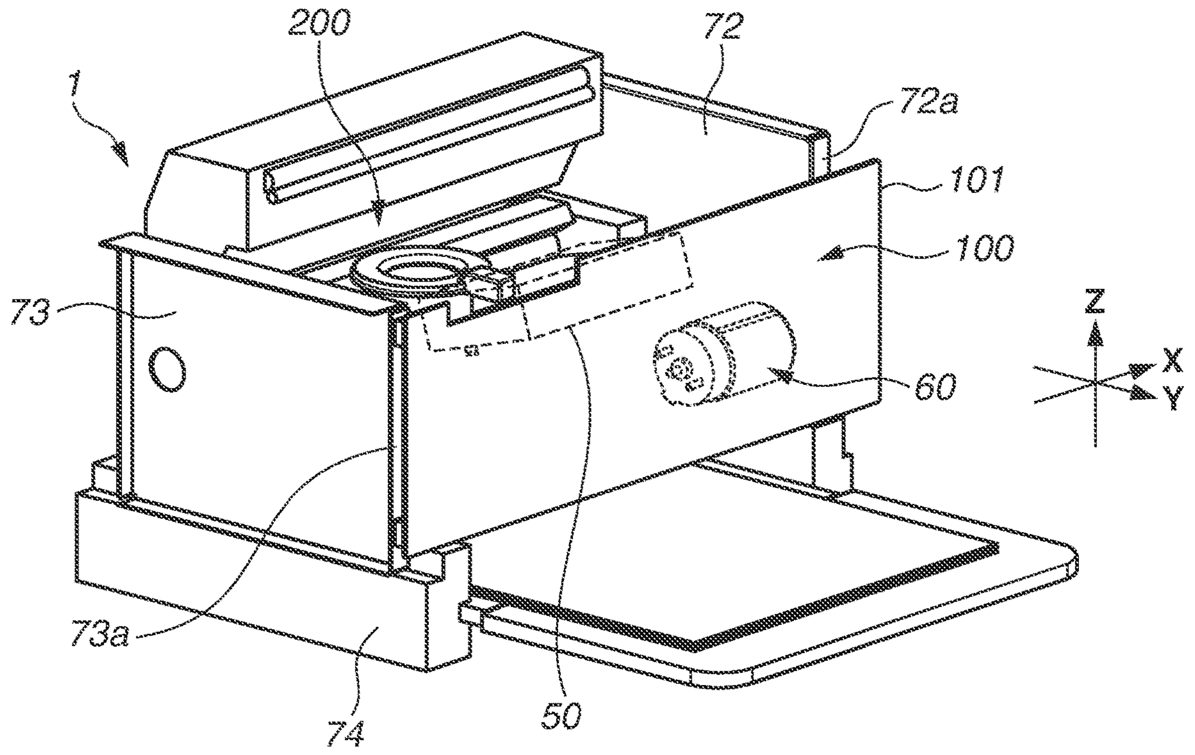
FIG. 3 is a perspective view illustrating a position of a circuit substrate.

The arrangement of the circuit substrate 100 according to the present exemplary embodiment will be described in detail with reference to FIGS. 3 to 8. FIG. 3 is a perspective view of the image forming apparatus 1 that illustrates the arrangement of the circuit substrate 100. Unlike FIG. 1, the illustration of the front cover 70 and the exterior cover 71 is omitted in FIG. 3. FIG. 3 newly illustrates an installation portion 200 for supplying toner. In the image forming apparatus 1 according to the present exemplary embodiment, a user or a serviceman can supply developer from the installation portion 200, and the installation portion 200 is connected with the container 18 inside the apparatus. The details of the installation portion 200 will be described below.

As illustrated in FIG. 3, the circuit substrate 100 is installed on the front side, and the scanner unit 50 and a drive motor 60 (drive source) are provided on a further rear side of the circuit substrate 100 (minus side in the Y direction). Because the scanner unit 50 and the drive motor 60 are actually located at invisible positions in FIG. 3, these members are indicated by dotted lines.

As illustrated in FIG. 3, the image forming apparatus 1 includes a right plate frame 72, a left plate frame 73, and a base frame 74. The circuit substrate 100 is supported by these frame members, and is mounted on the image forming apparatus 1 in such a manner that the plate surface becomes substantially parallel to an XZ plane. Bent portions 72a and 73a provided for reinforcement are formed at the respective end portions in the Y direction of the right plate frame 72 and the left plate frame 73. The bent portion 72a is bent toward the X direction plus side in such a manner as to be substantially parallel to the XZ plane, and the bent portion 73a is bent toward the X direction minus side in such a manner as to be substantially parallel to the XZ plane. In this manner, by bending the plate frames on the both sides toward the outside of the image forming apparatus 1, it becomes possible to mount electronic components on a broader area of the wiring plate 101.

Figure 4:
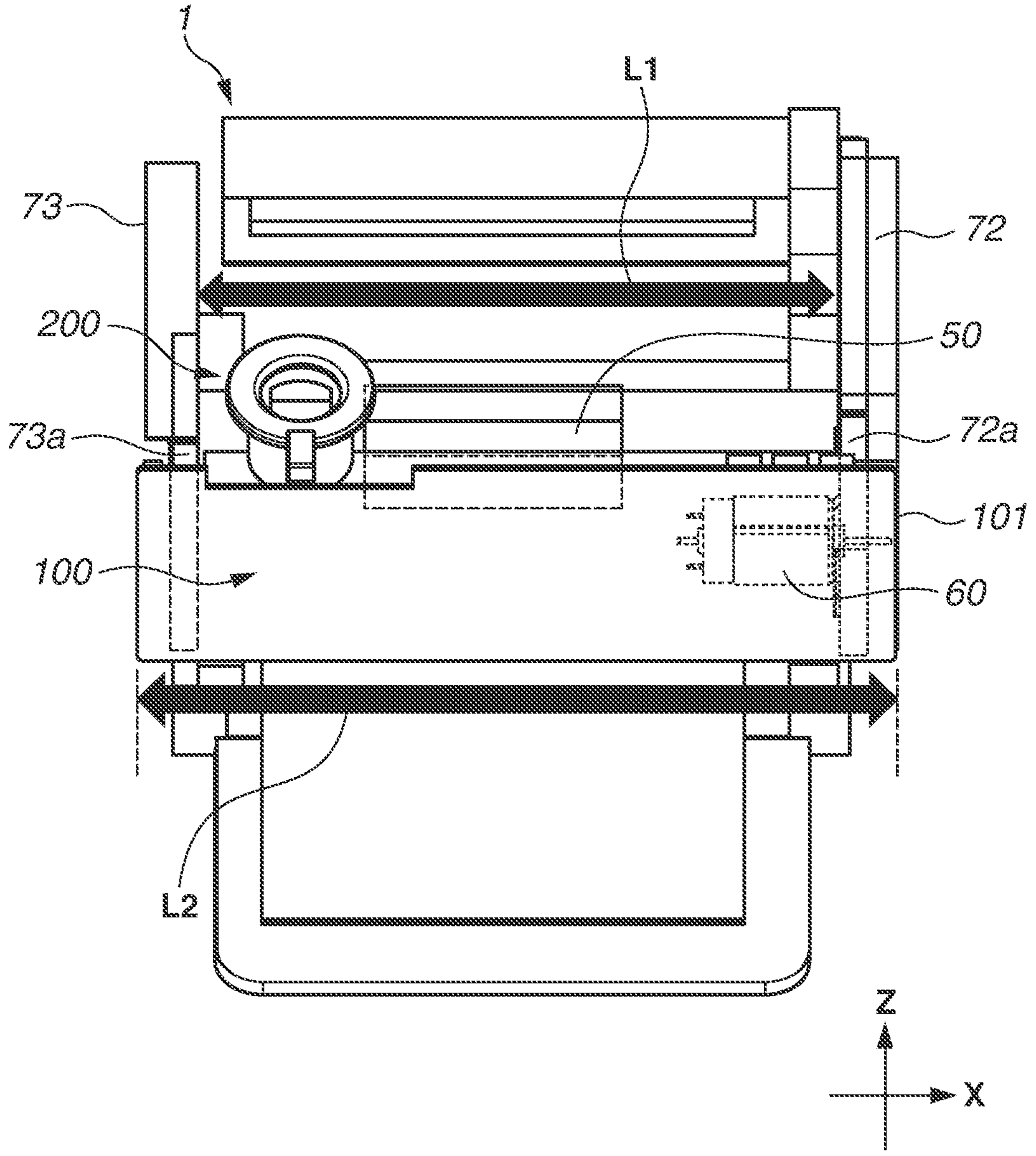
FIG. 4 is a front perspective view illustrating a position of the circuit substrate.

FIG. 4 is a front perspective view of the image forming apparatus 1 that illustrates the arrangement of the circuit substrate 100. As illustrated in FIG. 4, a distance L1 in the X direction between inner surfaces of the right plate frame 72 and the left plate frame 73 is shorter than a length L2 in the X direction of the circuit substrate 100. The wiring plate 101 is arranged on the plus side (front side) of the bent portions 72a and 73a in the Y direction. When viewed from the front side, the circuit substrate 100 and the bent portions 72a and 73a overlap. Because the bent portions 72a and 73a, the scanner unit 50, and a part of the drive motor 60 are actually located at invisible positions in FIG. 4, these members are indicated by dotted lines.

By providing the circuit substrate 100 on the front side in this manner in such a manner as to bridge the right plate frame 72 and the left plate frame 73, the image forming apparatus 1 needs not to include a bundle wire transversely connecting between the right plate frame 72 and the left plate frame 73 in the Y direction. Because a bundle wire length can be accordingly made shorter than that in a conventional apparatus, a cost can be reduced by an amount corresponding to the shortened length. Furthermore, because a region in which a bundle wire is laid out becomes smaller than that in the conventional apparatus, electrical noise can be reduced.

<Positional Relationship Between Electronic Component and Scanner Unit>

Next, a positional relationship between the electronic component 111 and the scanner unit 50 will be described in detail with reference to FIGS. 5 to 7.

Figure 5:
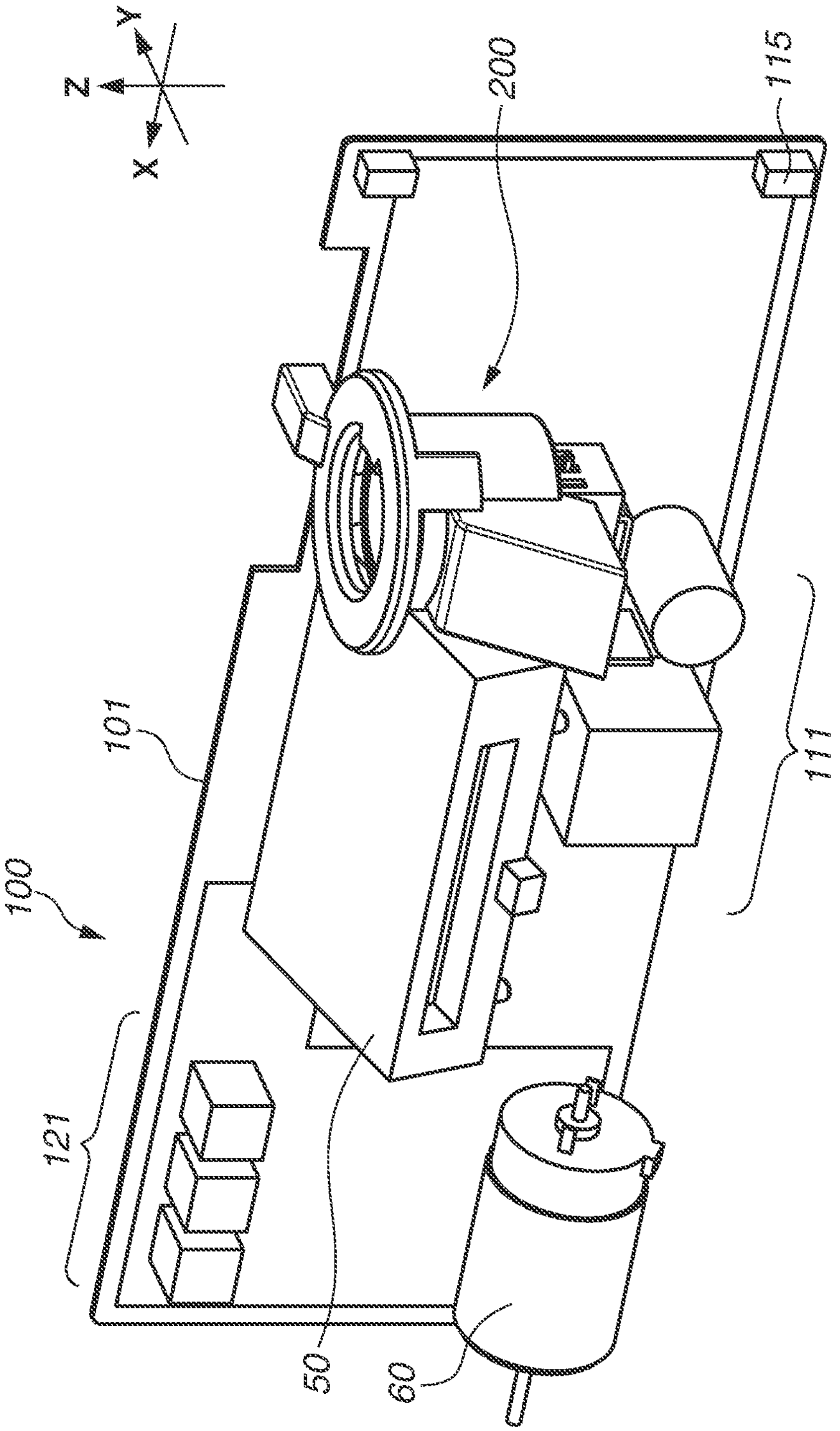
FIG. 5 is a perspective view of the circuit substrate and peripheral members of the circuit substrate.

FIG. 5 is a perspective view of the circuit substrate 100 viewed from a main body back side. The electronic components 111 having larger sizes in the Y direction than those of other members are gathered in a lower part of the wiring plate 101 for effectively utilizing a space, and are mounted in such a manner as to fit within a lower part of the scanner unit 50. A power input unit 115 is provided at an end portion of the wiring plate 101. The power input unit 115 is connected with an inlet 116 to be described below, and receives power supply from a commercial power source.

Figure 6:
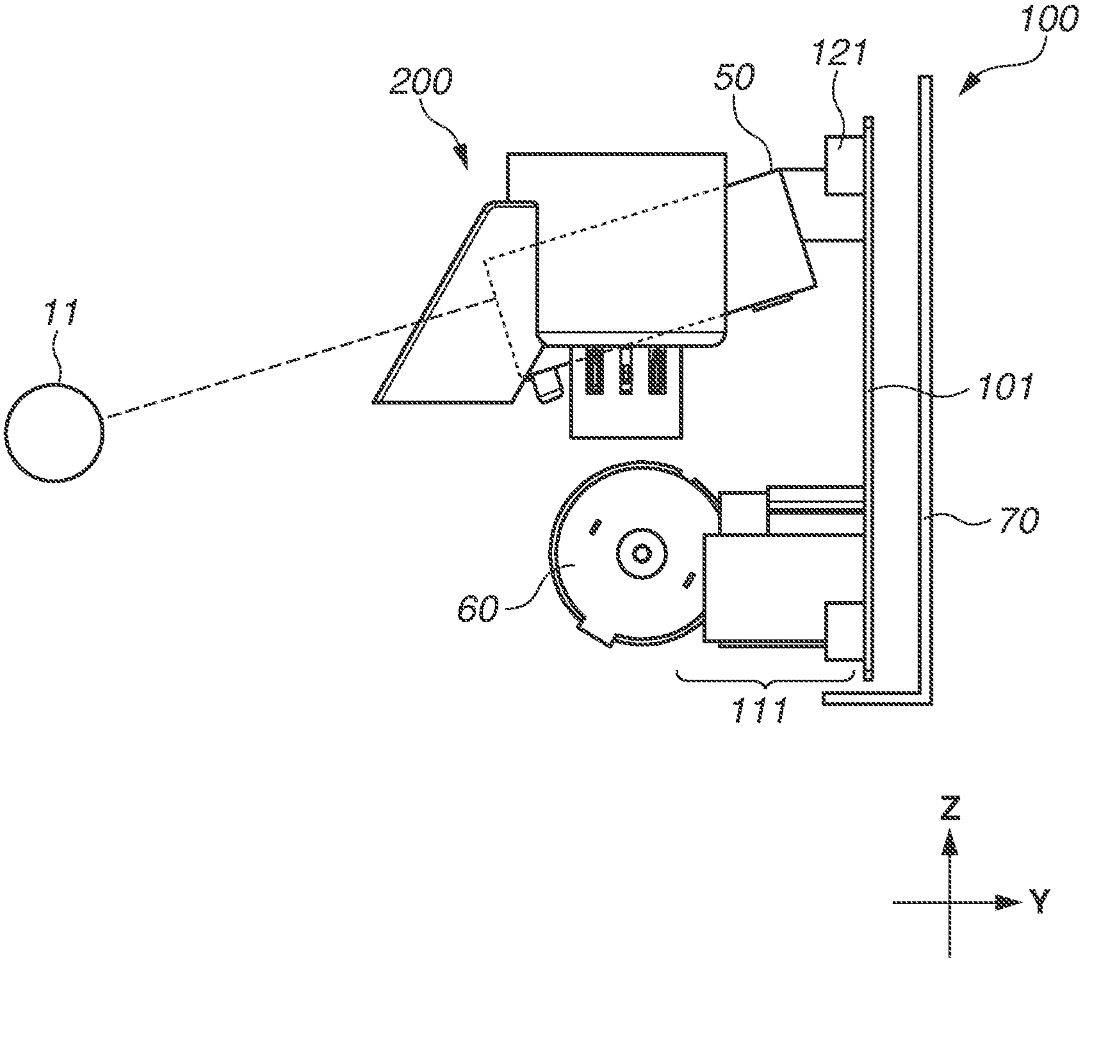
FIG. 6 is a side view of the circuit substrate and peripheral members of the circuit substrate.

FIG. 6 is a diagram of the circuit substrate 100 viewed from the main body left side. Because the installation portion 200 overlaps a part of the scanner unit 50, and the part is actually located at an invisible position, this region is indicated by a dashed-dotted line. The scanner unit 50 is arranged at a position most appropriate for irradiating the photosensitive drum 11 with laser light indicated by a dotted line. At a point at which the scanner unit 50 and the wiring plate 101 come closest to each other in the Y direction, members such as the electronic components 111 that considerably protrude from the plate surface are not arranged. In other words, the scanner unit 50 and the electronic component 111 are arranged by being shifted in the Z direction in such a manner as not to interfere with each other.

Figure 7:
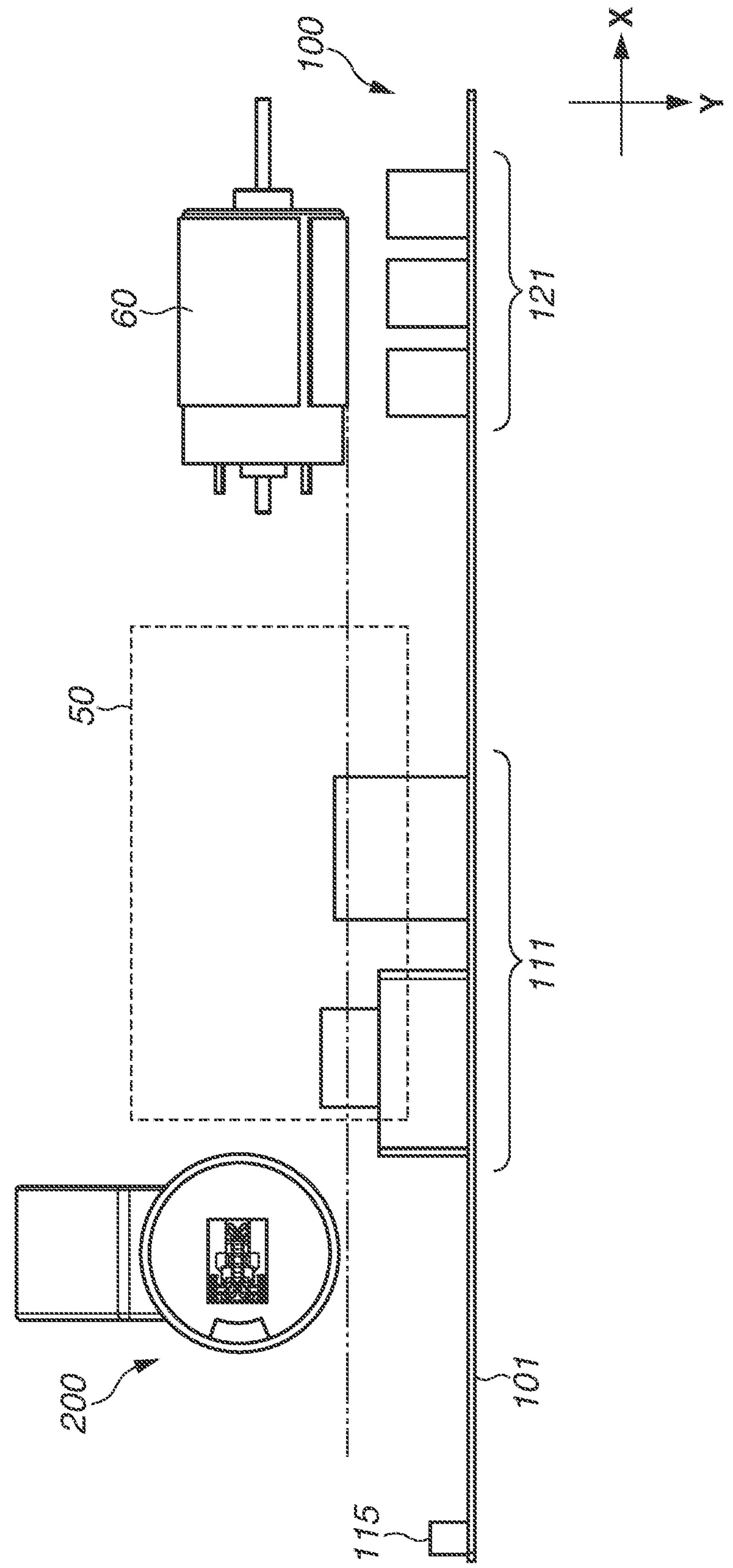
FIG. 7 is a top view of the circuit substrate and peripheral members of the circuit substrate.

FIG. 7 is an enlarged top view of the circuit substrate 100 viewed from the main body top surface. As seen from FIG. 7, the scanner unit 50 and the electronic component 111 are arranged at positions partially overlapping with each other. As described above, because the scanner unit 50 is located on the upside of the electronic component 111, the electronic component 111 is originally invisible from this direction. In FIG. 7, for clearly indicating a positional relationship between the two members, the scanner unit 50 is indicated by a dotted line, and the electronic component 111 is illustrated in a perspective manner.

By arranging the electronic component 111 at the above-described position in this manner, a distance in the Y direction (front-back direction) between the circuit substrate 100 and the scanner unit 50 can be shortened, and the image forming apparatus 1 can be downsized.

<Positional Relationship Between Electronic Component and Drive Motor>

Next, a positional relationship between the electronic component 111 and the drive motor 60 will be described in detail with reference to FIGS. 5 to 7. The drive motor 60 has a function of rotating the photosensitive drum 11 and a conveyance member (the pickup roller 3, the feeding roller 5*a*, the conveyance roller pair 5*c*, etc.) for feeding and conveying the recording material P.

As illustrated in FIG. 5, the drive motor 60 protrudes toward the minus side in the X direction, and the wiring plate 101 is arranged on the main body front side of the drive motor 60. It can be seen that the electronic component 111 is mounted by avoiding the drive motor 60 in such a manner as not to interfere with the drive motor 60. As illustrated in FIG. 6, when viewed from the main body left side surface, the drive motor 60 and the electronic component 111 are arranged at positions partially overlapping each other. Then, as illustrated in FIG. 7, when viewed from the main body top surface, the drive motor 60 and the electronic component 111 are arranged by being shifted in the X direction in such a manner as not to interfere with each other.

By arranging the electronic component 111 at the above-described position in this manner, it is possible to shorten a distance in the Y direction (front-back direction) between the circuit substrate 100 and the drive motor 60, and downsize the image forming apparatus 1.

<Configuration of Attachment to Main Body>

Figure 8:
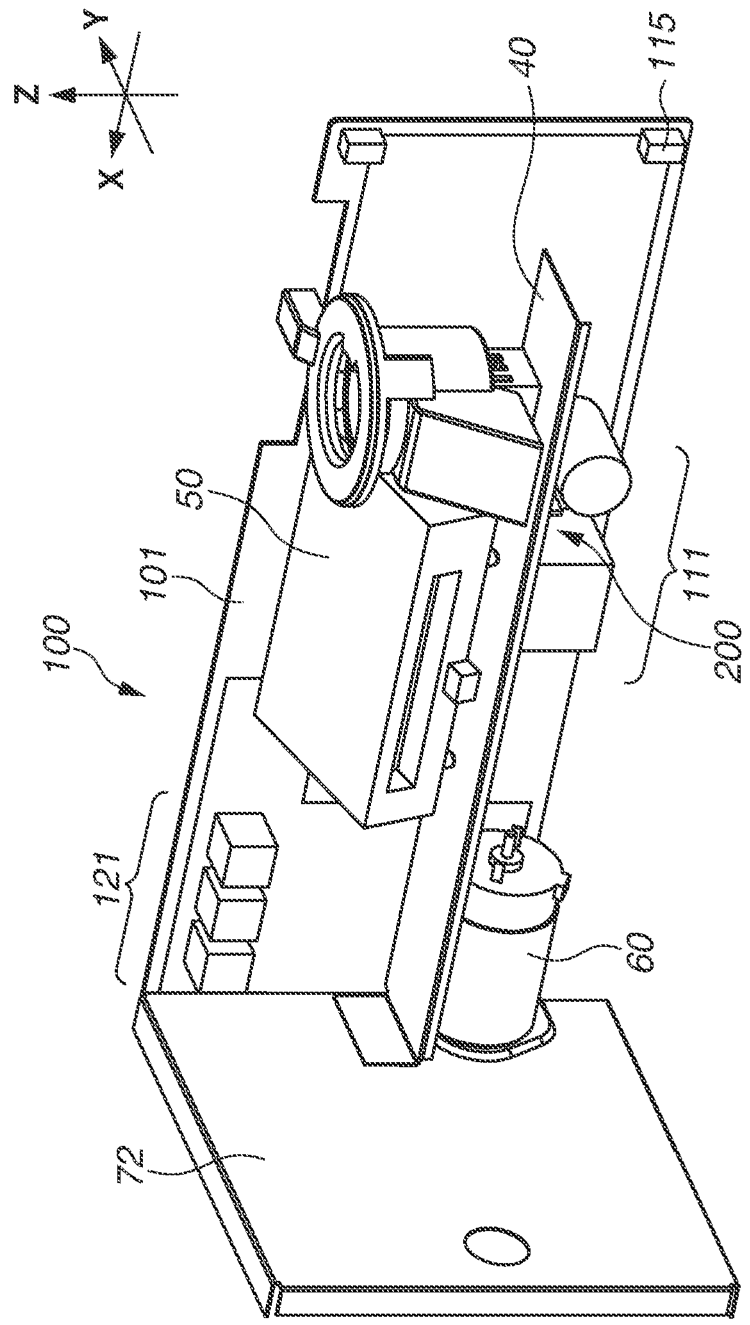
FIG. 8 is a perspective view illustrating a holding configuration of a scanner unit and a drive motor.

Next, a configuration of attaching the scanner unit 50 and the drive motor 60 to the main body will be described in detail with reference to FIG. 8. FIG. 8 is a diagram obtained by adding the right plate frame 72 and a scanner holding member 40 to the perspective view in FIG. 5. The illustration of the left plate frame 73 and the base frame 74 is omitted.

The scanner unit 50 is held by the scanner holding member 40. The scanner holding member 40 is fixed to the right plate frame 72 and the left plate frame 73 (not illustrated in FIG. 8), and is configured to pass through the lower part of the installation portion 200 and bridge the two frames. On the other hand, the drive motor 60 is attached to the right plate frame 72, and a gear coupled to the drive motor 60 is provided on the X direction plus side (right side) of the right plate frame 72. Drive force of the drive motor 60 is transmitted to the feeding roller 5*a* and the photosensitive drum 11 via the gear.

[Configuration of Circuit Substrate]

Figure 9:
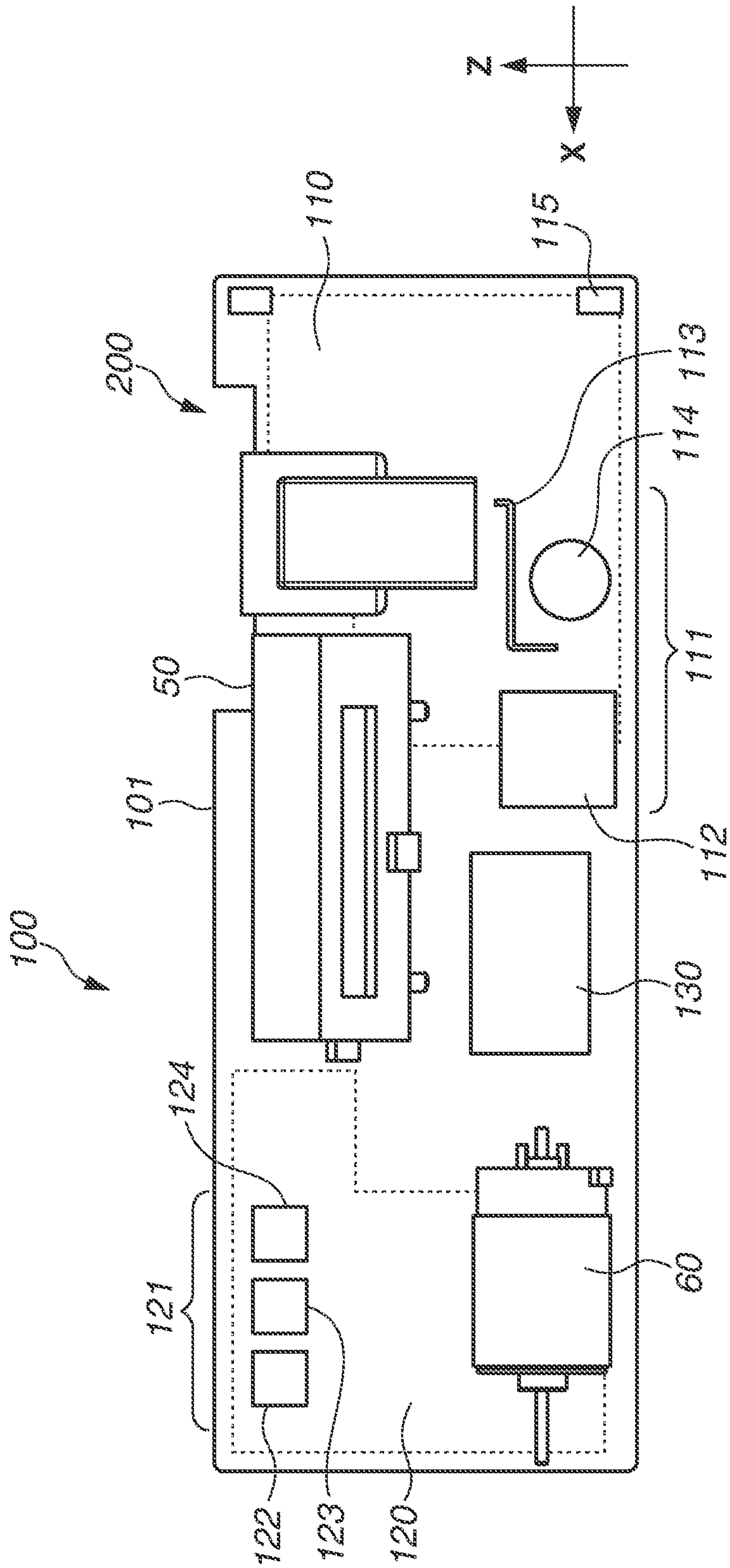
FIG. 9 is a back view of the circuit substrate viewed from a direction vertical to a substrate surface.
Figure 10:
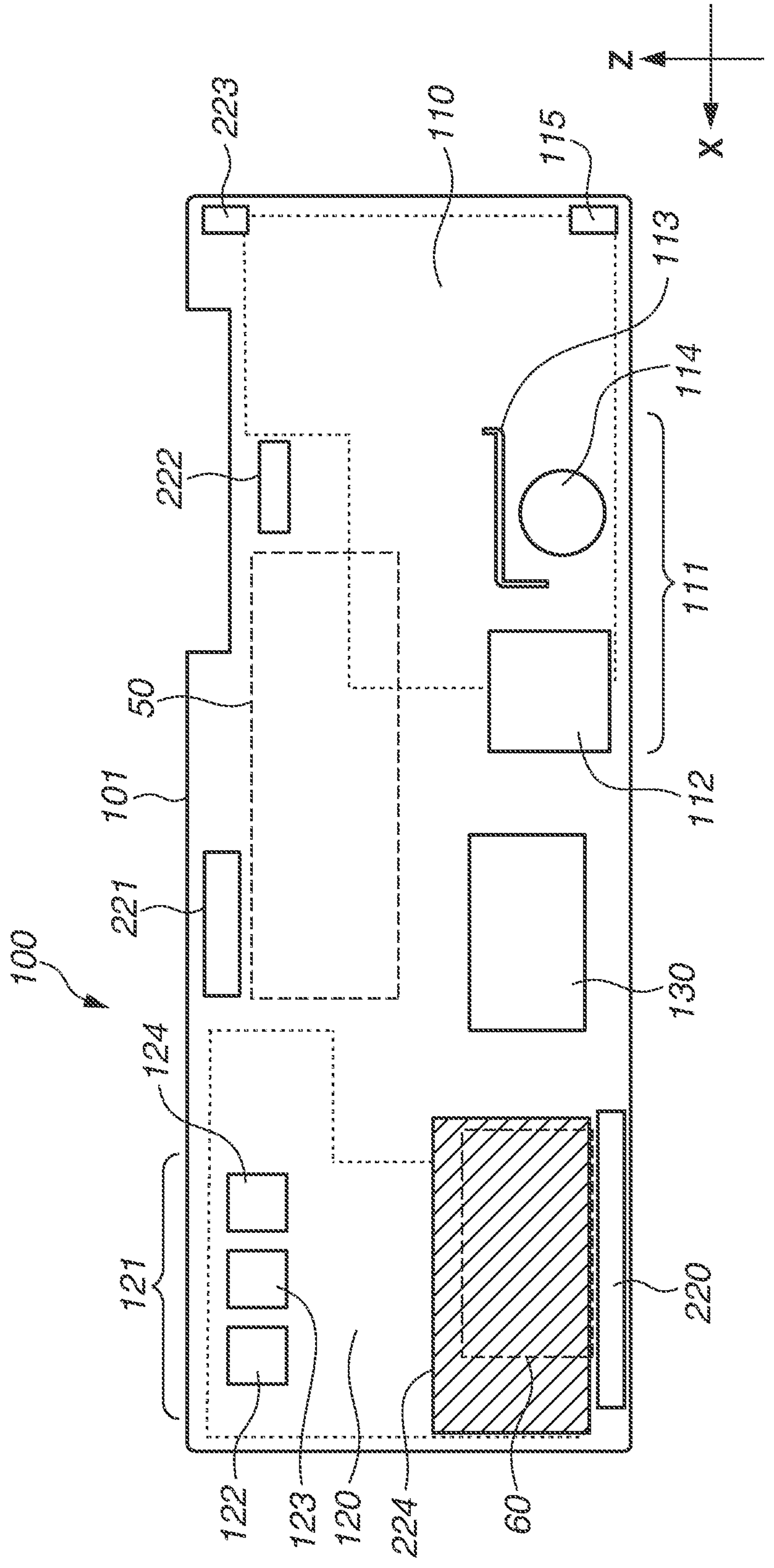
FIG. 10 is a diagram illustrating electronic components on the circuit substrate.

Next, a configuration of the circuit substrate 100 will be described with reference to FIGS. 9 and 10. FIG. 9 is a back view of the circuit substrate 100 viewed from the main body back side. FIG. 9 illustrates not only the circuit substrate 100 but also the scanner unit 50, the drive motor 60, and the installation portion 200 together. FIG. 10 illustrates only the circuit substrate 100.

The circuit substrate 100 includes a low-voltage power source unit 110 that takes in alternating-current power from an external commercial power source and converts the alternating-current power into direct-current power, and a high-voltage power source unit 120 for supplying a high voltage necessary for image formation, to each process member. On the circuit substrate 100 according to the present exemplary embodiment, the low-voltage power source unit 110 and the high-voltage power source unit 120 are mounted on the same substrate.

The low-voltage power source unit 110 includes a low-voltage power transformer 112, a heatsink 113, and an electrolytic capacitor 114 as the electronic components 111 having large sizes in the Y direction. The low-voltage power source unit 110 further includes the power input unit 115. The high-voltage power source unit 120 includes a charging transformer 122, a development transformer 123, and a transfer transformer 124 as the electronic components 121 having large sizes in the Y direction. As clearly seen from FIG. 9, all the electronic components 111 and 121 having large sizes in the Y direction are arranged in such a manner as to avoid the positions of the scanner unit 50, the drive motor 60, and the installation portion 200.

Other components provided on the circuit substrate 100 will be described with reference to FIG. 10. A plurality of connectors 220, 221, 222, and 223 is provided at upper or lower end portions of the circuit substrate 100, and the circuit substrate 100 is connected with various members by a bundle wire. The connector 220 is connected with the drive motor 60 and a sensor (not illustrated) that detects the recording material P being conveyed. The connector 221 is connected with a laser output unit (not illustrated) of the scanner unit 50, and a scanner motor (not illustrated) for rotating a polygon mirror. The connector 222 is connected with a control panel (not illustrated) including a power switch and an execution key to be operated by the user, and a video controller 140. The connector 223 is connected with the fixing heater 9*c*. In a shaded portion 224 facing the drive motor 60, electronic components having small sizes in the Y direction among components in the high-voltage power source unit 120 are mounted. Specifically, a resistor and a jumper line are provided. The resistor provided at the position has a function of adjusting various biases output from the charging transformer 122, the development transformer 123, and the transfer transformer 124.

Figure 11:
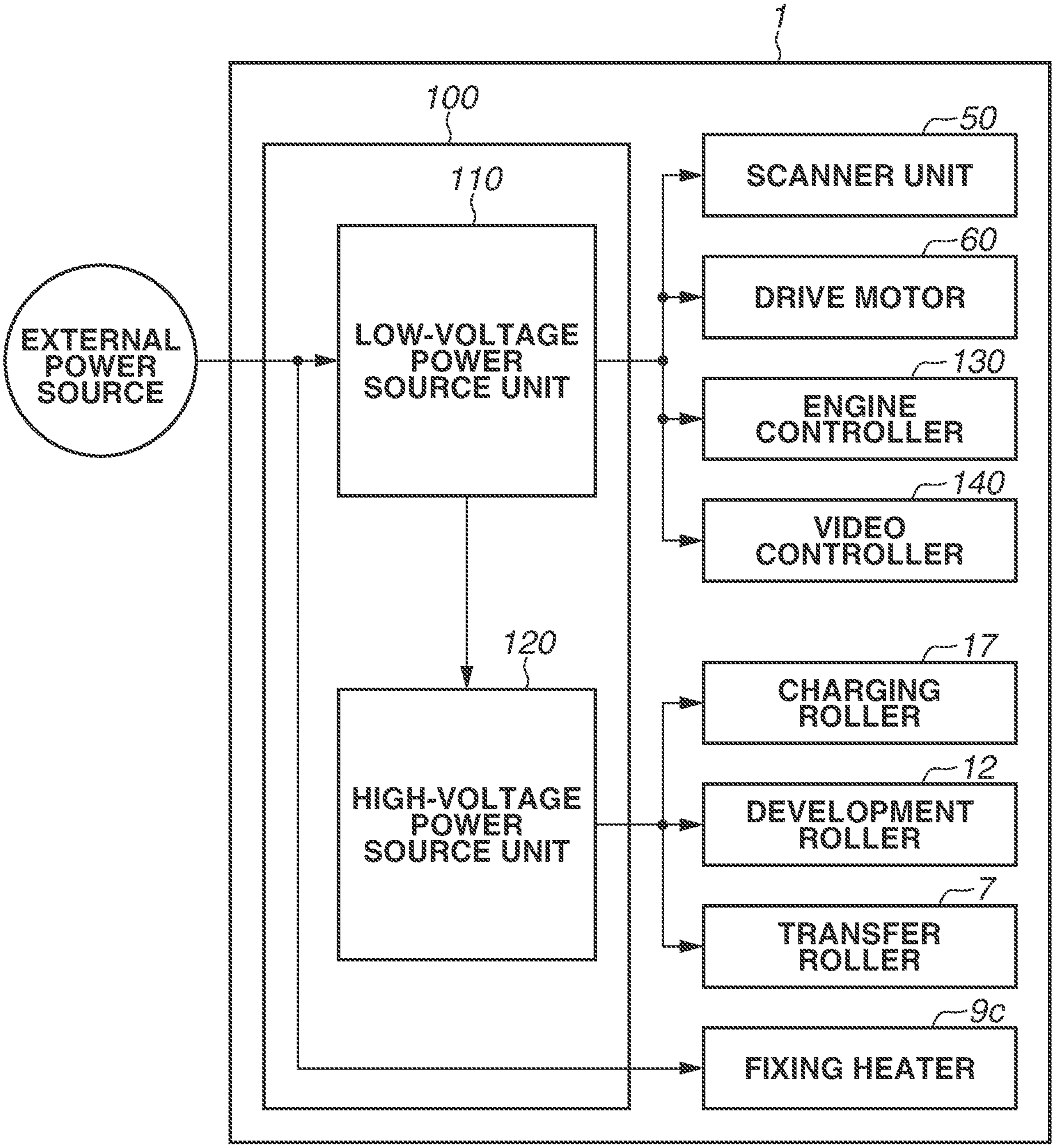
FIG. 11 is a block diagram illustrating functions of the circuit substrate.

Next, functions of the low-voltage power source unit 110 and the high-voltage power source unit 120 will be described with reference to FIGS. 9 and 11. FIG. 11 is a block diagram illustrating functions of the circuit substrate 100.

First of all, the low-voltage power source unit 110 takes in power from an external power source via the power input unit 115 mounted at a substrate end portion, and converts an alternating-current voltage into a stable direct-current voltage by a rectification smoothing circuit including an electrolytic capacitor 114. After that, the low-voltage power source unit 110 converts a direct-current voltage into a high-frequency alternating-current voltage by a switching element such as a transistor, and inputs the high-frequency alternating-current voltage to the low-voltage power transformer 112. The low-voltage power transformer 112 converts the high-frequency alternating-current voltage, which is an input voltage, into an alternating-current voltage (output voltage) having a desired voltage value. The low-voltage power source unit 110 converts the alternating-current voltage into a direct-current voltage again, and outputs the obtained direct-current voltage to the high-voltage power source unit 120. Because the loss of individual circuit components appears as heat in the low-voltage power source unit 110, the heatsink 113 manufactured using aluminum or iron is provided for releasing heat.

The high-voltage power source unit 120 converts a voltage (e.g., 24 V) supplied from the low-voltage power source unit 110, into a high voltage necessary for an image forming process such as charging, development, and transfer. The charging transformer 122 converts a voltage supplied from the low-voltage power source unit 110, into a charging voltage, and the converted voltage is then supplied to the charging roller 17. The development transformer 123 converts a voltage supplied from the low-voltage power source unit 110, into a development voltage, and the converted voltage is then supplied to the development roller 12. The transfer transformer 124 converts a voltage supplied from the low-voltage power source unit 110, into a transfer voltage, and the converted voltage is then supplied to the transfer roller 7.

The low-voltage power source unit 110 supplies a voltage (e.g., 3.3 V or 5 V) not only to the high-voltage power source unit 120 but also to the scanner unit 50, the drive motor 60, an engine controller 130, and the video controller 140. The engine controller 130 functions as a control unit that comprehensively controls various process members. The engine controller 130 includes a central processing unit (CPU) (not illustrated), a random access memory (RAM) (not illustrated) used for calculating and temporarily storing data necessary for controlling the image forming apparatus 1, and a read-only memory (ROM) (not illustrated) storing programs and various types of data for controlling the image forming apparatus 1. The video controller 140 has a function of receiving print data by communicating with an external device such as a personal computer, and notifying the engine controller 130 of an analysis result of the print data. The engine controller 130 and the video controller 140 may be provided on a substrate different from the circuit substrate 100, or may be provided on the same substrate. In the present exemplary embodiment, the engine controller 130 is provided on the circuit substrate 100 as illustrated in FIGS. 9 and 10.

Alternating-current power received by the power input unit 115 from a commercial power source is supplied not only to the low-voltage power source unit 110 but also to the fixing heater 9*c*. On the circuit substrate 100 illustrated in FIG. 10, a triac (not illustrated) is provided between the power input unit 115 and the connector 223. The temperature of the fixing heater 9*c* can be adjusted by switching between on and off of the triac and changing a sinusoidal waveform. The rollers in the fixing device 9 are driven by the drive motor 60.

[Arrangement and Configuration of Replenishment Unit]

Next, the installation portion 200 will be described with reference to FIGS. 12 to 16. As described above, the image forming apparatus 1 is provided with the installation portion 200 for supplying toner from the outside without detaching the container 18 from the housing 720 in a case where a remaining amount of toner in the container 18 becomes small.

The installation portion 200 has a configuration to which the replenishment pack 310 serving as a replenishment cartridge, which will be described below, can be attached.

Figure 12:
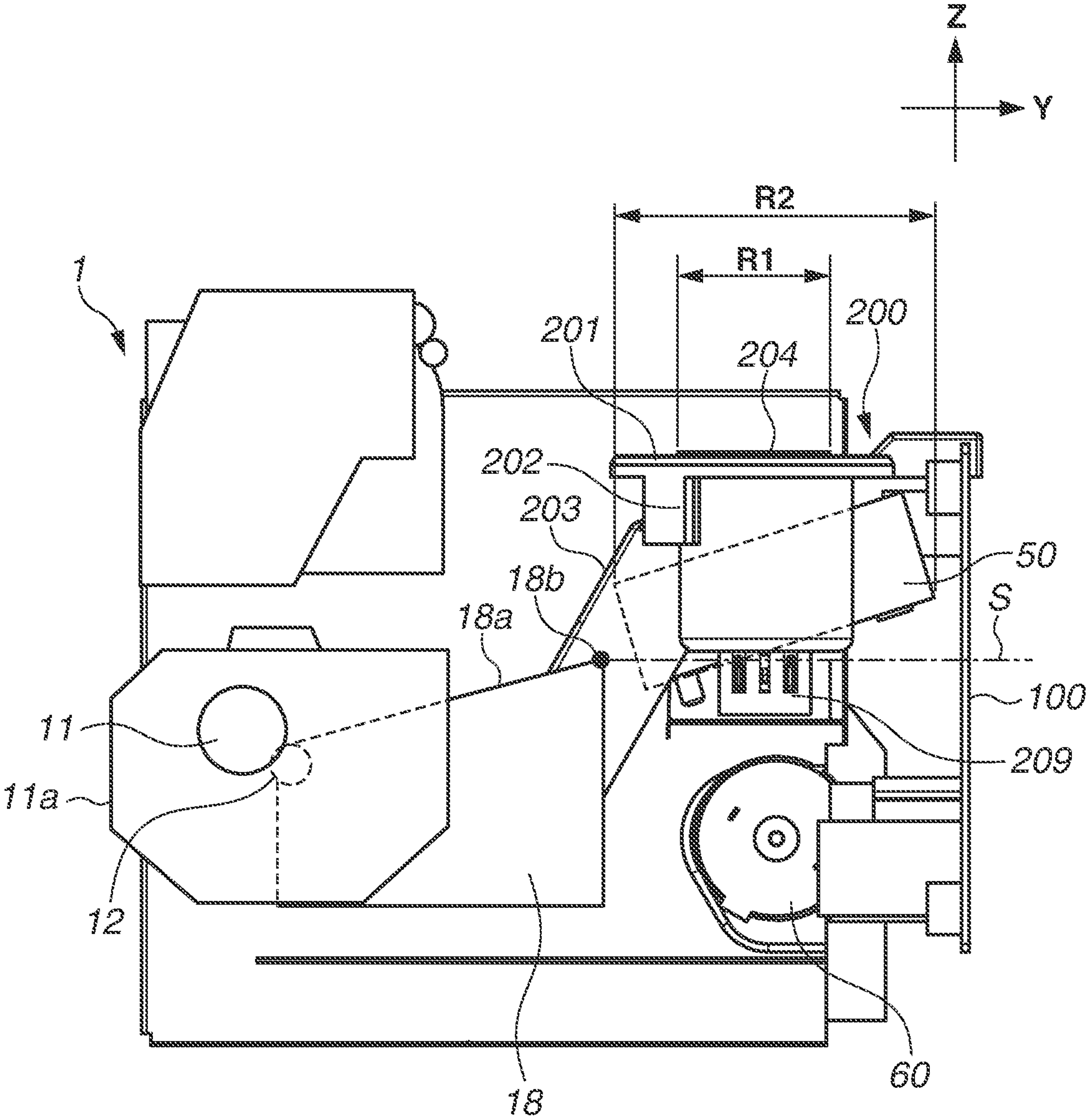
FIG. 12 is a side view illustrating positions of a replenishment unit and the scanner unit.

FIG. 12 is a left side view of the image forming apparatus 1 viewed from the rotational axis direction of the photosensitive drum 11. In FIG. 12, the exterior cover 71 and the left plate frame 73 are removed. The installation portion 200 includes an operation unit 201 to which the replenishment pack 310 (not illustrated in FIG. 12) is to be attached, a toner acceptance portion 202 having a cylindrical shape, and a replenishment pathway portion 203 connecting the container 18 and the toner acceptance portion 202. The operation unit 201 forms a replenishment port 204, which is a space for inserting the replenishment pack 310. Through the replenishment port 204, toner moves to the toner acceptance portion 202 and the replenishment pathway portion 203 in this order, and toner is finally supplied to the container 18. The operation unit 201 includes a rotary lever 201*b* serving as a grip member to be gripped by the user for rotating the operation unit 201.

Because the installation portion 200 overlaps a part of the scanner unit 50 and the part is actually located at an invisible position, this region is indicated by a dotted line in FIG. 12. Specifically, the toner acceptance portion 202 and the replenishment pathway portion 203 of the installation portion 200 overlap the scanner unit 50. More specifically, the toner acceptance portion 202 and the replenishment pathway portion 203 are located at positions overlapping the scanner unit 50 in the Z direction. When a region in the Y direction (horizontal direction) in which the replenishment port 204 is provided is denoted by R1, and a region in the Y direction in which the scanner unit 50 is provided is denoted by R2, the regions R1 and R2 overlap.

A virtual surface passing through an upper end portion 18*b* located at an uppermost position of a frame member 18*a* of the container 18, and being parallel to the horizontal surface is denoted by S. In FIG. 12, the virtual surface S is indicated by a dashed-dotted line. It can be seen that a part of the installation portion 200 is located on the plus side (upside) in the Z direction with respect to the virtual surface S. In other words, a part of the installation portion 200 protrudes toward the upside with respect to the upper end portion 18*b* of the container 18. Specifically, the part of the installation portion 200 includes the entire operation unit 201, a part of the toner acceptance portion 202, and a part of the replenishment pathway portion 203. In addition, the parts of the toner acceptance portion 202 and the replenishment pathway portion 203 that protrude toward the upside from the virtual surface S overlap the scanner unit 50.

As illustrated in FIG. 12, because a drum frame member 11*a* supporting the photosensitive drum 11 overlaps a part of the container 18, and the part is actually located at an invisible position, the region is indicated by a dotted line.

The container 18 supports the development roller 12 bearing developer. Because the development roller 12 is actually located at an invisible position as well, the development roller 12 is indicated by a dotted line in FIG. 12.

Figure 13:
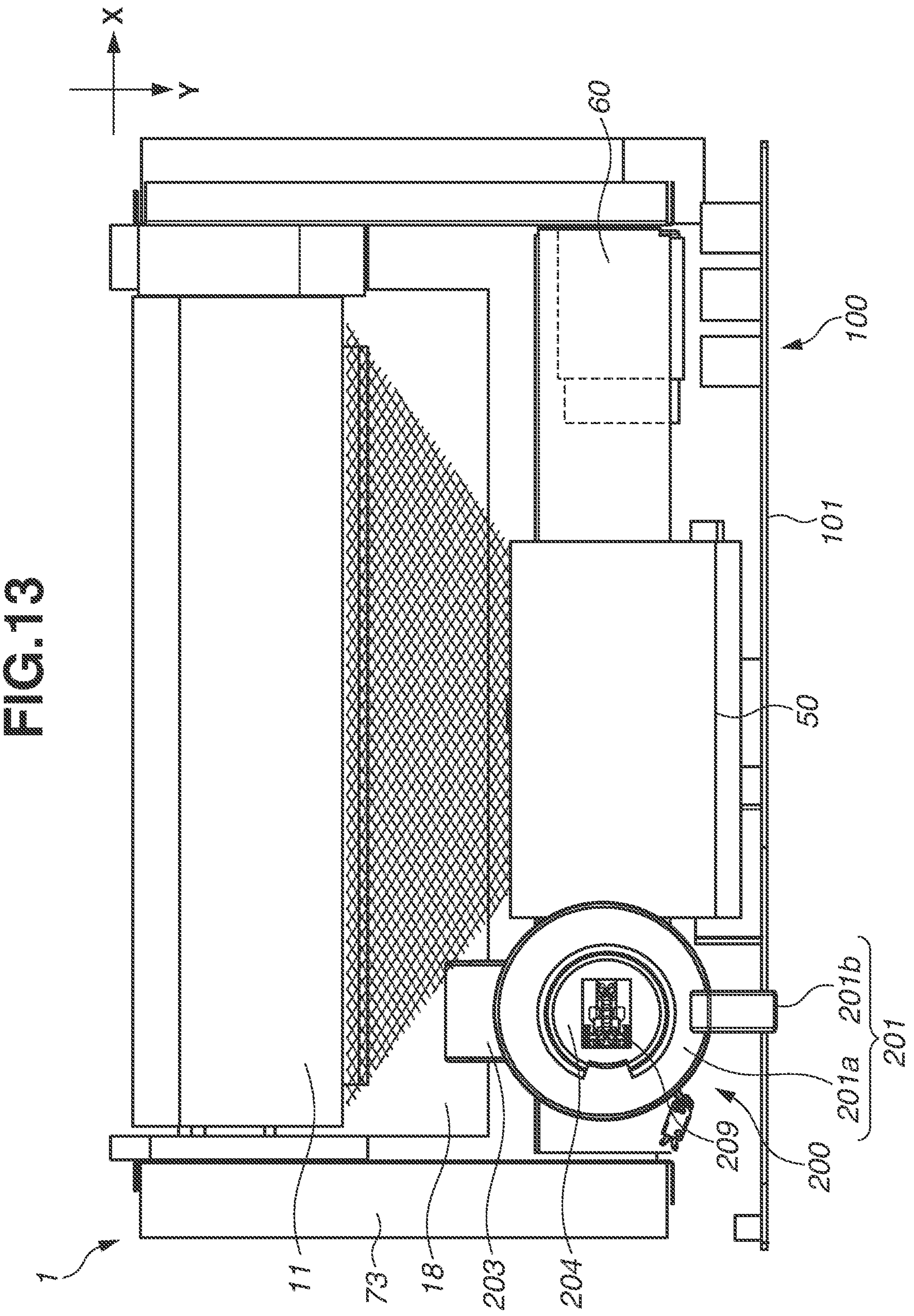
FIG. 13 is a top view illustrating positions of the replenishment unit and the scanner unit.
Figure 14:
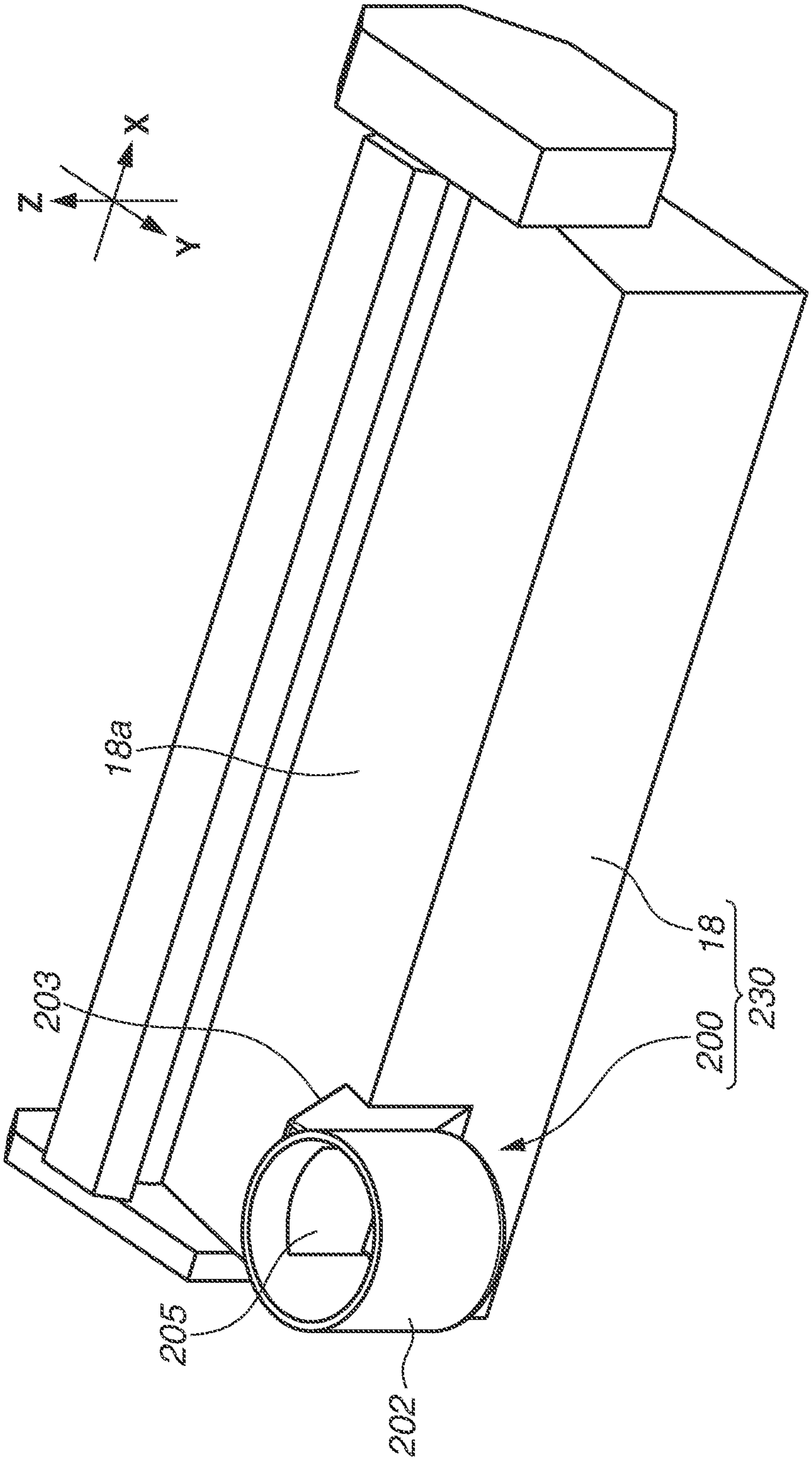
FIG. 14 is a perspective view of a developer container.

In a bottom part of the installation portion 200, a communication unit 209 is provided at a place facing an insertion direction of a replenishment container. The details of the function of the communication unit 209 will be described below. FIG. 13 is a top view of the image forming apparatus 1 from which the exterior cover 71 is removed. As described above, the operation unit 201 forms the replenishment port 204 through which an insertion portion 312 passes. Furthermore, the operation unit 201 includes a ring portion 201*a* arranged in such a manner as to surround the replenishment port 204, and the rotary lever 201*b* connected to the ring portion 201*a*. As illustrated in FIG. 14, a width in the X direction of the installation portion 200 is shorter than a width in the X direction of the container 18.

Laser light emitted from the scanner unit 50 onto the photosensitive drum 11 spreads in a trapezoidal shape as illustrated in FIG. 13, by the function of a polygon mirror (not illustrated) and a lens (not illustrated). Thus, a width of the scanner unit 50 in the X direction is shorter than a width of the photosensitive drum 11 in the X direction. A space is consequently produced between the left end of the scanner unit 50 and the left plate frame 73, and the installation portion 200 is provided in the space in the present exemplary embodiment. In other words, as illustrated in FIG. 13, the installation portion 200 is provided between the scanner unit 50 and the left plate frame 73 in the X direction. Furthermore, the replenishment port 204 and the scanner unit 50 are adjacently provided within a region in the X direction in which the container 18 is provided. By providing the installation portion 200 at such a position, the influence on the size of the image forming apparatus 1 can be reduced.

The installation portion 200 is provided on the opposite side of the drive motor 60 across the scanner unit 50. Because the drive motor 60 employed in the present exemplary embodiment is relatively small, as illustrated in FIG. 13, the installation portion 200 and the drive motor 60 do not overlap in the Z direction. Thus, the installation portion 200 and the drive motor 60 can be provided on the same side of the scanner unit 50. Nevertheless, in a case where the drive motor 60 having a larger size is employed, the installation portion 200 is to be provided at a position shifted upward. The image forming apparatus 1 consequently up sizes.

In a case where a configuration of providing the installation portion 200 on the opposite side of the drive motor 60 is adopted as described in the present exemplary embodiment, the drive motor 60 having a larger size can be employed without upsizing the image forming apparatus 1. In other words, a degree of freedom in design can be ensured. FIG. 14 is a perspective view of a developer container 230 including the container 18 and the installation portion 200. In FIG. 14, the illustration of the operation unit 201 of the installation portion 200, and some members associated with the operation unit 201 is omitted. As illustrated in FIG. 14, the installation portion 200 includes an acceptance opening 205 that leads to the replenishment pathway portion 203 and that is formed on an inside wall of the toner acceptance portion 202 having a cylindrical shape. The acceptance opening 205 is a lateral opening provided on the side surface of the inside wall of the toner acceptance portion 202. Toner is guided from the toner acceptance portion 202 to the replenishment pathway portion 203 via the acceptance opening 205, and then stored into the container 18 via the replenishment pathway portion 203.

Figure 15A:
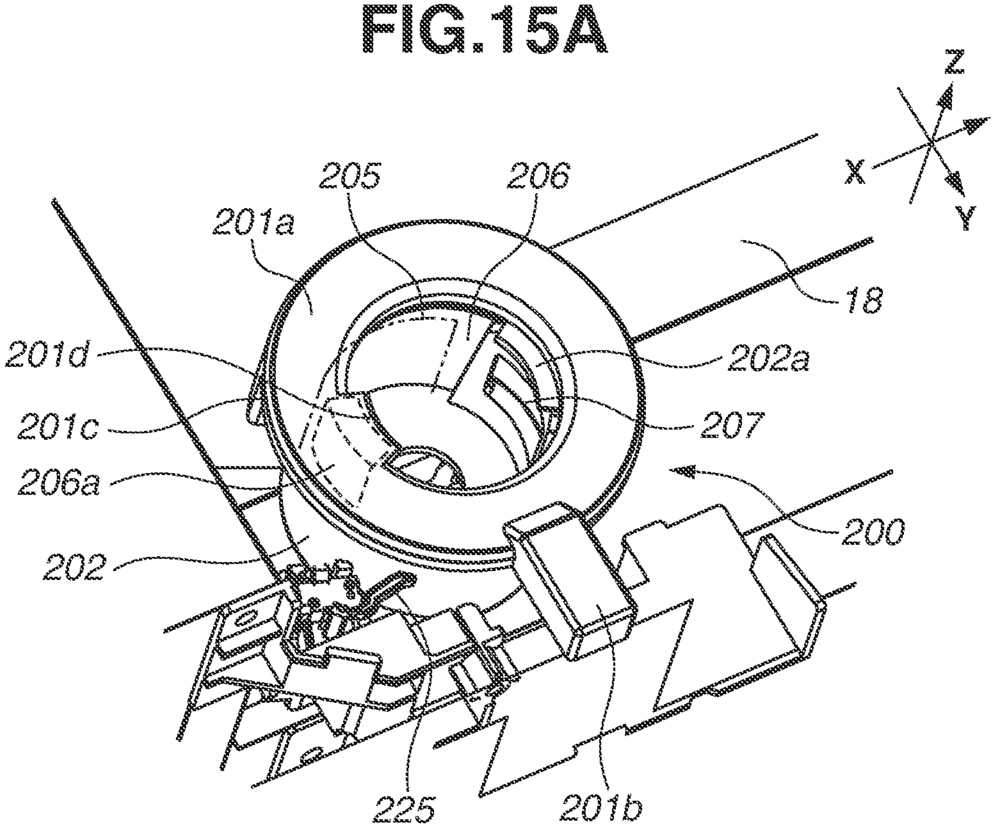
FIG. 15A is an enlarged perspective view of an installation portion in a case where a movable member is located at a first position.
Figure 15B:
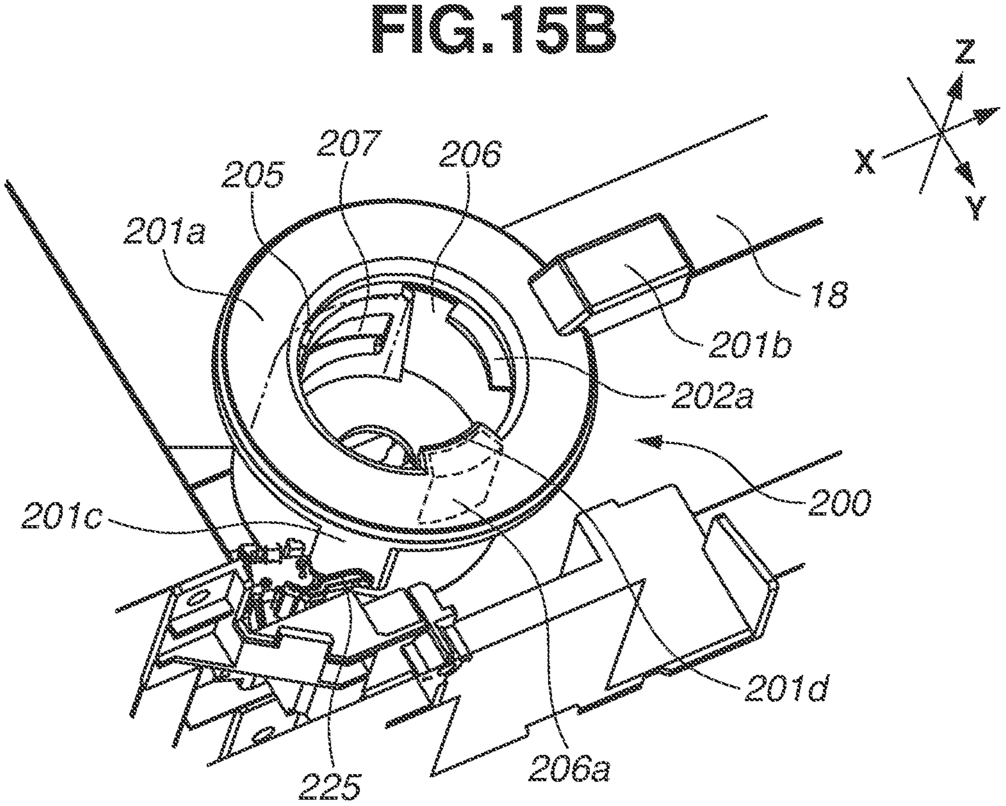
FIG. 15B is an enlarged perspective view of the installation portion in a case where the movable member is located at a second position.

FIGS. 15A and 15B are enlarged perspective views of the installation portion 200. In FIG. 15A, because the acceptance opening 205 formed on the toner acceptance portion 202 is blocked by a main body shutter portion 206 serving as a movable member, and is actually invisible, the acceptance opening 205 is indicated by a dotted line. The main body shutter portion 206 is a cylindrical member concentric with the toner acceptance portion 202, and is provided inside the toner acceptance portion 202. A shutter opening 207 for letting toner through is also formed on the main body shutter portion 206. The shutter opening 207 is a connecting opening for connecting the acceptance opening 205 and a lateral opening 313 (refer to FIG. 17).

Because the acceptance opening 205 and the shutter opening 207 are located at shifted positions in FIG. 15A, the acceptance opening 205 is blocked.

A first drive force transmission rib 201*d* of the operation unit 201 and a second drive force transmission rib 206*a* of the main body shutter portion 206 can engage with a drive force transmitted unit 314*b* of a pack shutter portion 314, which will be described below in detail.

By attaching the replenishment pack 310, these transmission ribs engage with the drive force transmitted unit 314*b* of the pack shutter portion 314. The drive force transmitted unit 314*b* of the pack shutter portion 314 is an engaged portion. The second drive force transmission rib 206*a* of the main body shutter portion 206 is a first engagement portion included in a movable member (second rotary member). The first drive force transmission rib 201*d* of the operation unit 201 is a second engagement portion.

In this state, the user can grip the rotary lever 201*b*, and rotate the rotary lever 201*b* by approximately 90° from the state in FIG. 15A to the state in FIG. 15B. The main body shutter portion 206, which is a movable member, can be rotated within the toner acceptance portion 202 of the main body shutter portion 206 in accordance with the rotation of the rotary lever 201*b*. In the present exemplary embodiment, the main body shutter portion 206 is a movable member included in a regulation unit, or the main body shutter portion 206 is also a second rotary member. In FIG. 15B, because the acceptance opening 205 and the shutter opening 207 are located at overlapping positions, the acceptance opening 205 is open, and toner can be supplied via the acceptance opening 205 in this state.

When an image is to be formed onto the recording material P, toner is agitated within the container 18 by an agitation member (not illustrated). Thus, the acceptance opening 205 is blocked in such a manner as to prevent toner from leaking from the acceptance opening 205. At the time of image formation (after the end of toner replenishment), the rotary lever 201*b* is moved to a first position illustrated in FIG. 15A. The first position will be referred to as a default position.

In the present exemplary embodiment, because the main body shutter portion 206 and the rotary lever 201*b* rotate integrally, the main body shutter portion 206 is also located at the default position in a state in which the rotary lever 201*b* is located at the default position.

On the other hand, when the container 18 is replenished with toner from the replenishment pack 310 to be described below, the acceptance opening 205 is to be opened. The rotary lever 201*b* is therefore caused to reach a second position illustrated in FIG. 15B, at the time of toner replenishment. In the present exemplary embodiment, the second position is a regulation position at which the replenishment pack 310 is regulated in such a manner as not to be detached, and is also a replenishment position at which toner is supplied from the replenishment pack 310. The second position is a position distant from the first position. In the present exemplary embodiment, because the main body shutter portion 206 and the rotary lever 201*b* rotate integrally, the main body shutter portion 206 is also located at the regulation position in a state where the rotary lever 201*b* is located at the regulation position.

The operation unit 201 is provided with a detected rib portion 201*c* serving as a detected portion, and a lever detection sensor 225, which is a first detection device for detecting the rotation of the rotary lever 201*b* gripped and rotated to the replenishment position. The lever detection sensor 225 is a contact-type sensor that conveys an ON signal to the engine controller 130 as a detection signal by detecting the contact of the detected rib portion 201*c*. A contactless sensor may be employed as the lever detection sensor 225.

If the lever detection sensor 225 detects the ON signal, a toner suppliable state is caused as illustrated in FIG. 15B. Thus, the agitation of toner in the container 18 is started by the agitation member (not illustrated). This prevents the stagnation of toner near the acceptance opening 205, and enables a smooth toner replenishment operation.

The toner acceptance portion 202 further includes a regulation rib 202*a*. In the present exemplary embodiment, a regulation unit that regulates the detachment of the replenishment pack 310 from the installation portion 200 in the Z direction is included. In the present exemplary embodiment, the regulation unit includes the regulation rib 202*a* of the toner acceptance portion 202 and the main body shutter portion 206 that moves the pack shutter portion 314.

Figure 16:
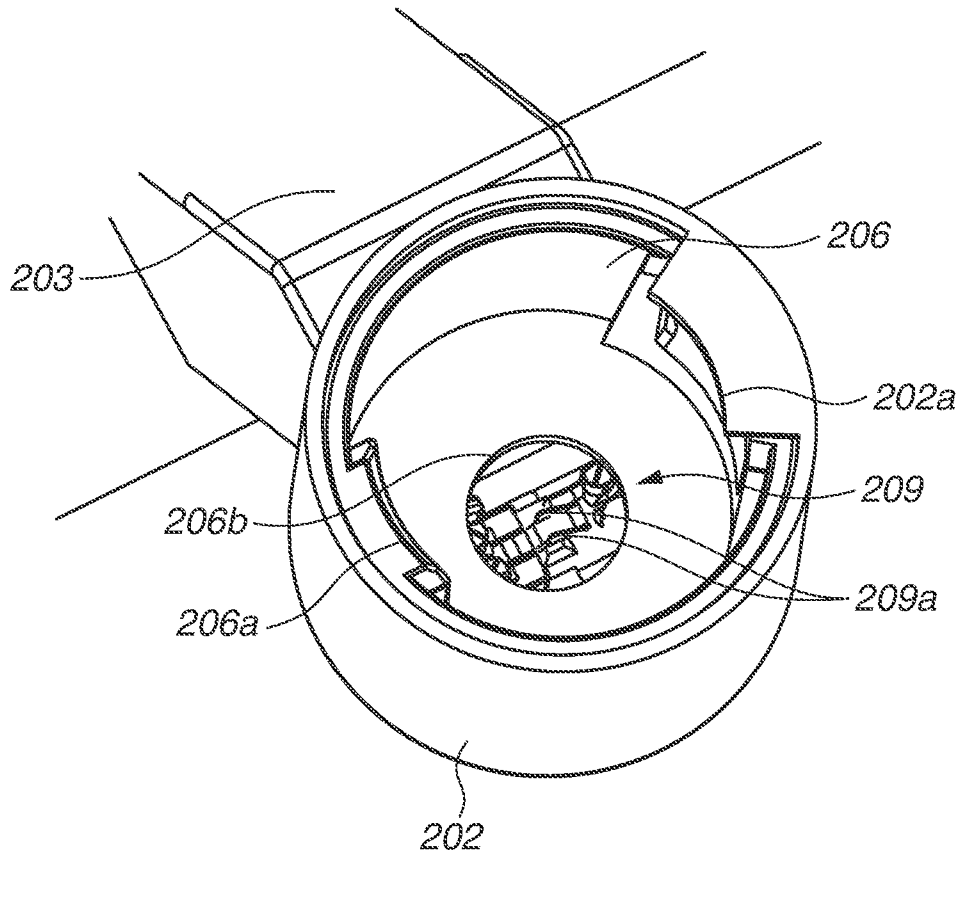
FIG. 16 is an enlarged perspective view of a communication unit.

FIG. 16 is an enlarged perspective view of the communication unit 209. The communication unit 209 includes a main body electric contact portion 209*a* serving as a first electric contact portion, and the main body electric contact portion faces toward the Z direction plus side (upside). The communication unit 209 is pressed toward the Z direction plus side by a pressing member 219 (not illustrated in FIG. 16).

The details of the engagement with the replenishment pack 310 will be described below. The main body shutter portion 206 further includes the second drive force transmission rib 206*a*, and a core positioning hole 206*b* for positioning a core of the replenishment pack 310.

[Configuration of Replenishment Pack]

Next, a configuration of the replenishment pack 310 will be described with reference to FIGS. 17A and 17B. FIG. 17B is a diagram of the replenishment pack 310 viewed from an angle different from that in FIG. 17A. The replenishment pack 310 includes a pouch portion 311 storing toner to be supplied, and the cylindrical insertion portion 312 to be inserted into the replenishment port 204. The pouch portion 311 is a storing unit that stores toner.

The replenishment pack 310 is attached to the installation portion 200 with the insertion portion 312 being regarded as a leading end side.

The replenishment pack 310 further includes the lateral opening 313, which is a discharge opening for discharging toner and formed on the side surface of the insertion portion 312, and the pack shutter portion 314 for stopping up the lateral opening 313 in such a manner that toner does not leak from the lateral opening 313. The pack shutter portion 314 is a first rotary member rotatable for opening and closing the lateral opening 313. The pouch portion 311 has a shape flattened toward the opposite side of the insertion portion 312, and a pouch end portion 316 extending in a predetermined direction is formed at the end of the pouch portion 311. A memory tag 318 serving as a memory device is provided on the bottom surface of the insertion portion 312. The bottom surface means a bottom surface in the Z direction in a state where the replenishment pack 310 is attached to the replenishment port 204.

The pack shutter portion 314 is a cylindrical member concentric with the insertion portion 312, and is provided on the outside of the insertion portion 312. The pack shutter portion 314 is configured to be rotatable with respect to the insertion portion 312. If the pack shutter portion 314 rotates and an opening of the pack shutter portion 314 and the lateral opening 313 of the insertion portion 312 match, toner can be supplied from the replenishment pack 310.

Figure 17A:
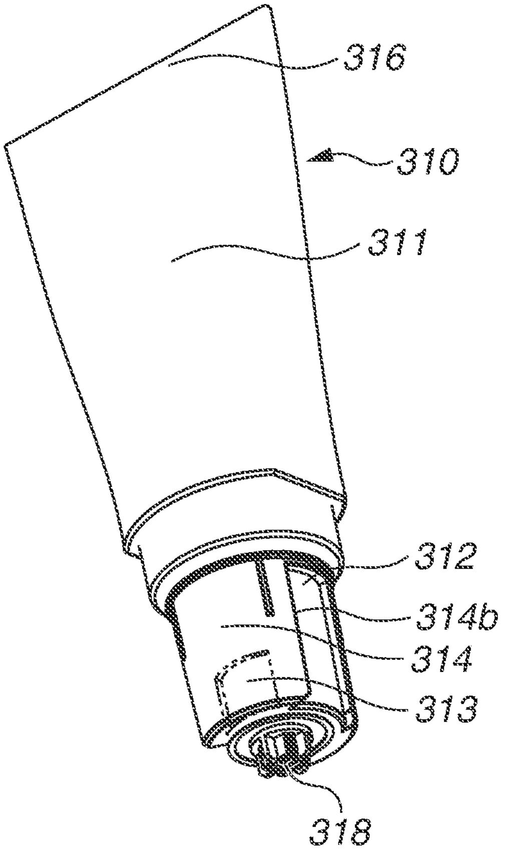
FIG. 17A is a diagram illustrating a configuration of a replenishment pack.
Figure 17B:
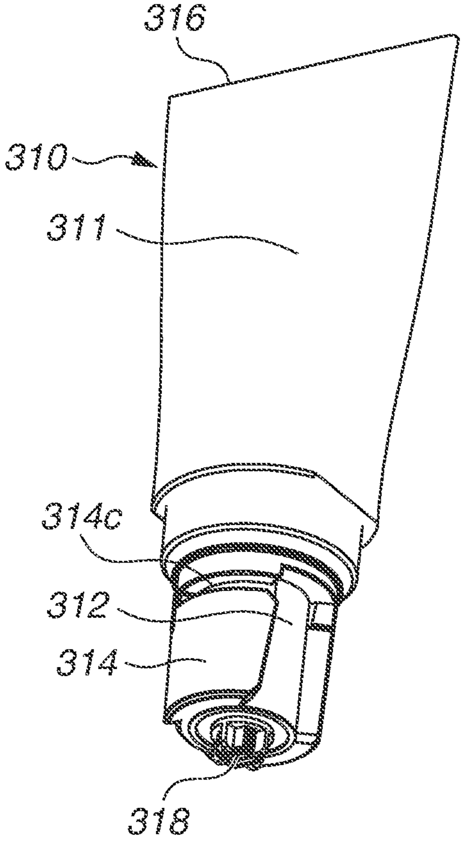
FIG. 17B is a diagram illustrating a configuration of the replenishment pack.

Because the lateral opening 313 formed on the insertion portion 312 is covered by the pack shutter portion 314, and is actually invisible in FIG. 17A, the lateral opening 313 is indicated by a dotted line. The drive force transmitted unit 314*b* is provided on the side surface of the pack shutter portion 314. When the replenishment pack 310 is inserted into the replenishment port 204, the drive force transmitted unit 314*b* engages with the first drive force transmission rib 201*d* and the second drive force transmission rib 206*a* illustrated in FIGS. 15A and 15B.

A positioning slit portion 314*c* is provided on the side surface of the pack shutter portion 314. By the rotation of the pack shutter portion 314, the regulation rib 202*a* provided on the above-described toner acceptance portion 202 enters the positioning slit portion 314*c*. In this state, the regulation rib 202*a* is in a state of being contactable with the positioning slit portion 314*c*.

Figure 18A:
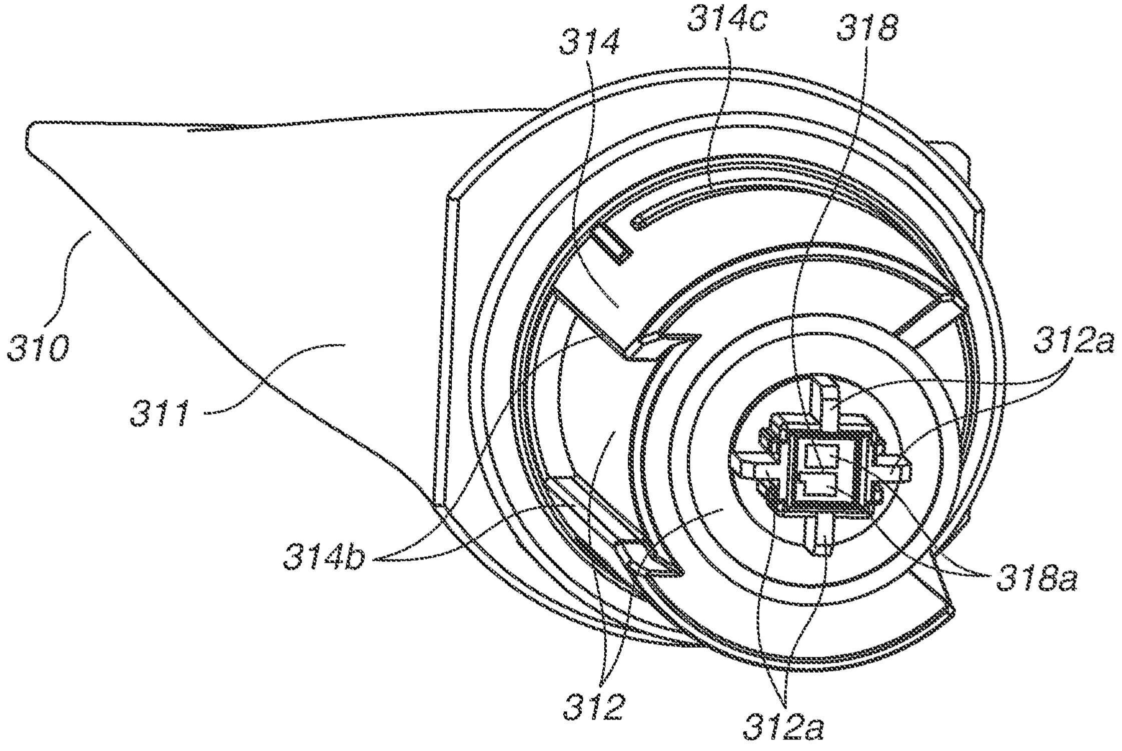
FIG. 18A is an enlarged perspective view of a memory device arranged on a bottom surface of a replenishment cartridge.
Figure 18B:
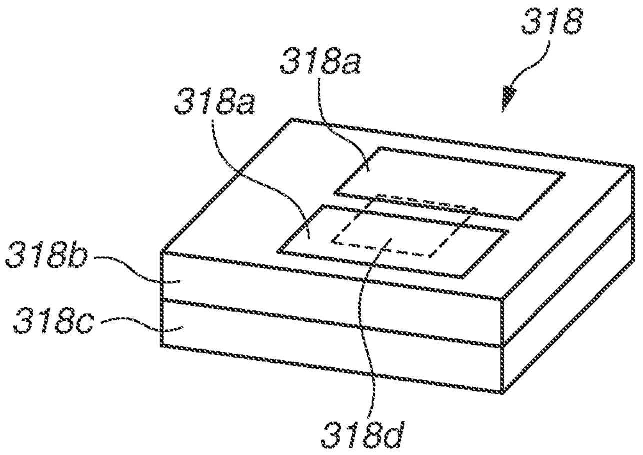
FIG. 18B is an enlarged view illustrating only the memory device.

FIG. 18A is an enlarged perspective view of the memory tag 318 arranged on the bottom surface of the replenishment pack 310. FIG. 18B is an enlarged view illustrating only the memory tag 318. The memory tag 318 is a plate-like member with an area of 5.5 mm×5 mm, and a thickness of 1.4 mm. The memory tag 318 is fixed to the insertion portion 312 in a state where an electric contact portion 318*a* serving as a second electric contact portion is exposed toward the bottom surface side. The memory tag 318 includes a storage element 318*d* on a rear surface 318*c* on the opposite side of a front surface 318*b* on which the electric contact portion 318*a* is provided. The storage element 318*d* stores information regarding the replenishment pack 310 such as a lot number, an amount of stored toner, and characteristics information of the replenishment pack 310, and characteristics information of an image forming apparatus to which the replenishment pack 310 is to be attached. By electrically communicating with the storage element 318*d* via the electric contact portion 318*a*, the engine controller 130 of the image forming apparatus 1 reads out information in the storage element 318*d*, and uses the information for controlling the image forming apparatus 1. A core positioning rib 312*a* for positioning a core of the main body shutter portion 206 when the replenishment pack 310 is attached to the installation portion 200 is provided on the bottom surface of the replenishment pack 310.

In the present exemplary embodiment, the description has been given of the configuration in which the memory tag 318 on which the electric contact portion 318*a* is mounted is arranged on the bottom surface of the insertion portion 312, but it is sufficient that the electric contact portion 318*a* is arranged on the bottom surface. For example, a configuration in which the storage element 318*d* communicating with the electric contact portion 318*a* is held on a portion other than the bottom surface of the insertion portion 312, and is connected therefrom with the electric contact portion 318*a* on the bottom surface by a conductive member such as a coil spring may be adopted.

Figure 19A:
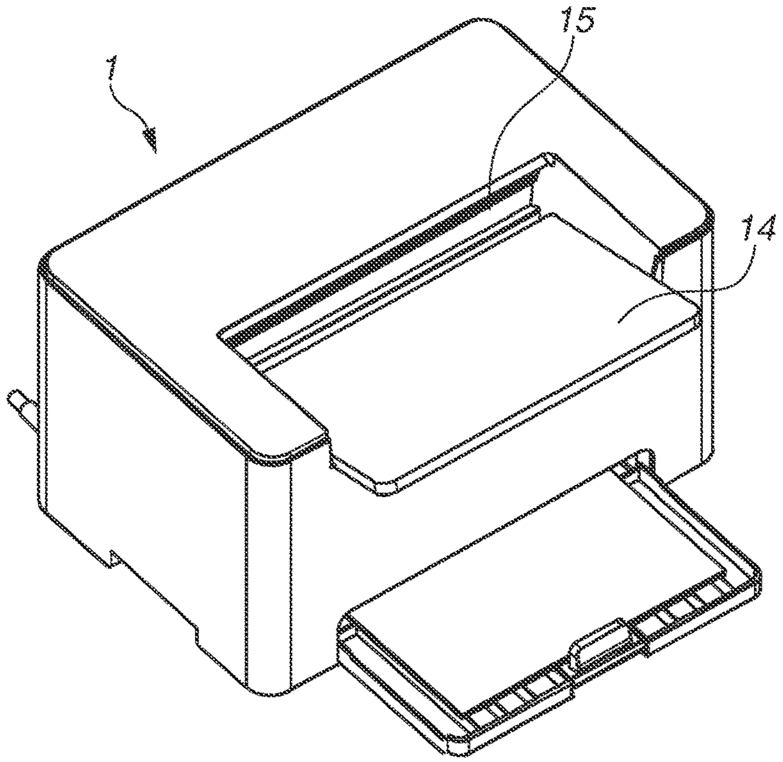
FIG. 19A is a perspective view illustrating a state in which a discharge tray is closed.
Figure 19B:
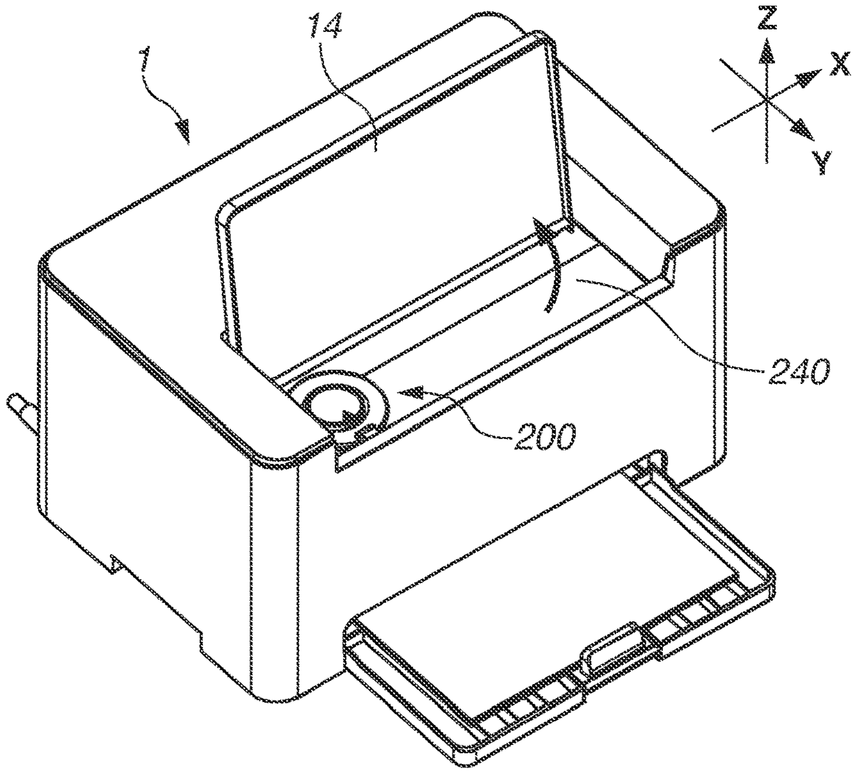
FIG. 19B is a perspective view illustrating a state in which the discharge tray is opened.

Next, a toner replenishment procedure that uses the replenishment pack 310, and a communication procedure of the memory tag 318 will be described with reference to FIGS. 19A and 19B to 21. FIGS. 19A and 19B are perspective views of the image forming apparatus 1 in a state where the discharge tray 14 is opened or closed. In the present exemplary embodiment, the discharge tray 14 has a retractable configuration movable between a stack position illustrated in FIG. 19A, at which the discharge tray 14 covers the installation portion 200 and the recording material P discharged from the discharge port 15 can be stacked, and a position illustrated in FIG. 19B, at which the installation portion 200 is exposed. Because the installation portion 200 is provided in an upper part of the main body front surface of the image forming apparatus 1, the user can easily access the installation portion 200 at the time of replenishment.

When toner is to be supplied, the recording material P stacked on the discharge tray 14 is removed, and the discharge tray 14 is opened and moved to the position illustrated in FIG. 19B. If the discharge tray 14 is opened, the installation portion 200 and a top surface portion 240 provided adjacently to the installation portion 200 are exposed. Then, the replenishment pack 310 is inserted into the exposed installation portion 200. At this time, as described above, the replenishment pack 310 is inserted in such a manner that the positions of the first drive force transmission rib 201*d* and the second drive force transmission rib 206*a* (FIG. 15) provided on the installation portion 200, and the drive force transmitted unit 314*b* (FIG. 18) provided on the replenishment pack 310 match.

Figure 20A:
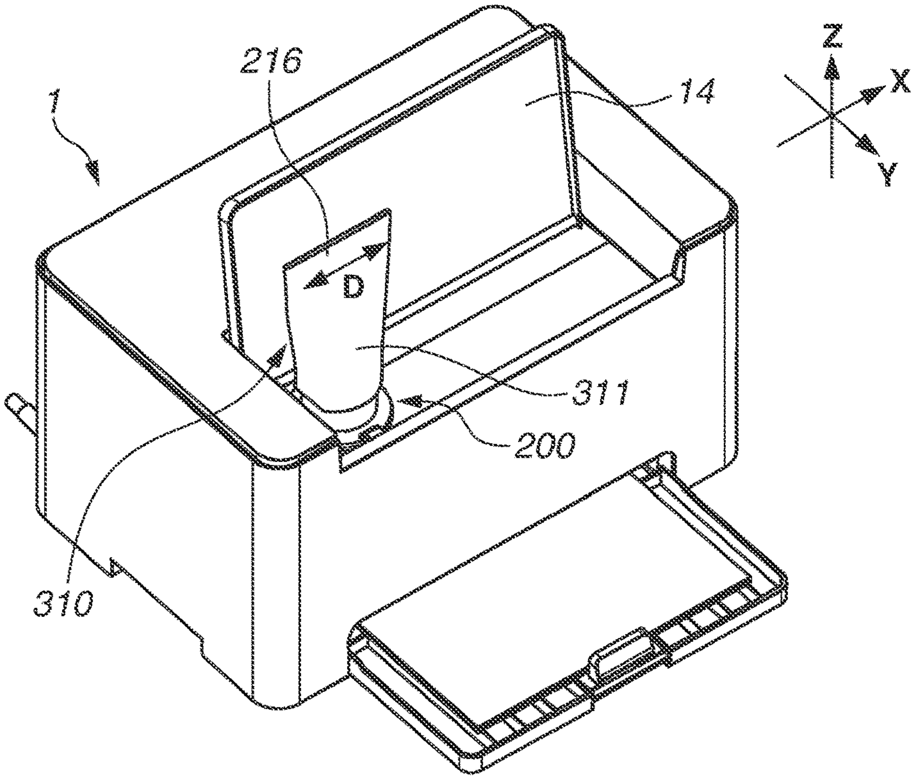
FIG. 20A is a perspective view illustrating a state in which the replenishment cartridge is inserted into the installation portion.
Figure 20B:
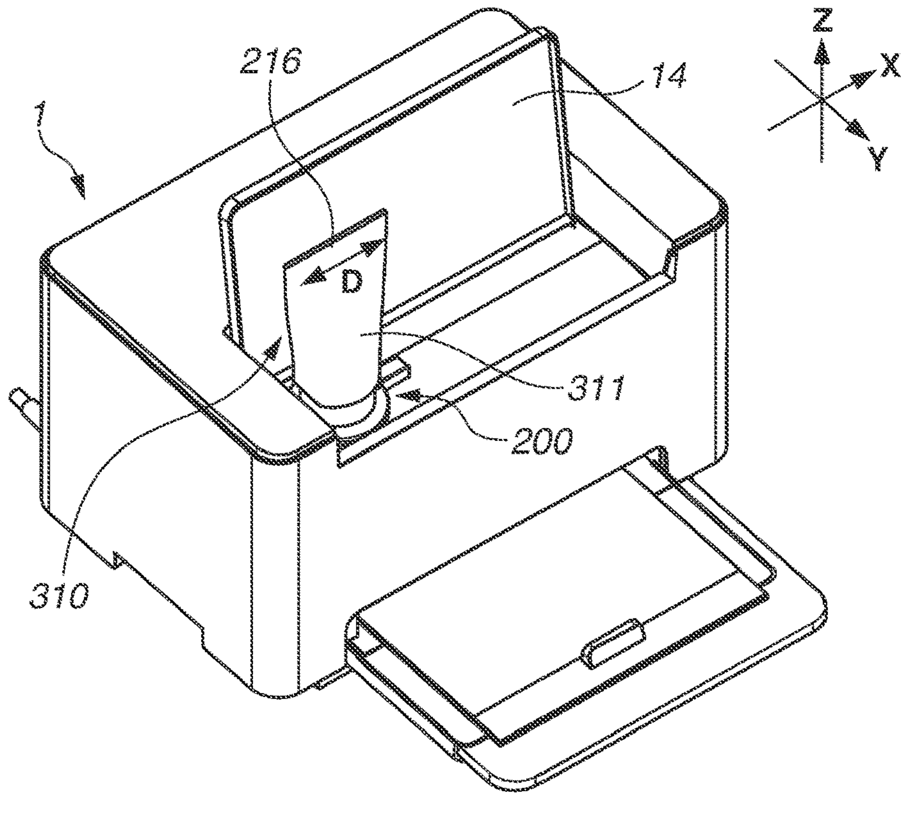
FIG. 20B is a perspective view illustrating a state in which an operation unit is rotated in a state in which the replenishment cartridge is inserted into the installation portion.

FIG. 20A illustrates a state in which the replenishment pack 310 is inserted into the installation portion 200. In the present exemplary embodiment, when a direction D in which the pouch end portion 316 extends becomes parallel to the X direction as illustrated in FIG. 20A, the replenishment pack 310 can be inserted. FIG. 20B illustrates a state in which the rotary lever 201*b* is moved from the default position to the replenishment position. As illustrated in FIG. 20A, in a state in which the replenishment pack 310 is attached to the installation portion 200, the entire pouch portion 311 of the replenishment pack 310 is not accommodated inside the image forming apparatus 1, and the pouch portion 311 is exposed to the outside of the image forming apparatus 1. Depending on the shapes of the insertion portion 312 and the pouch portion 311, a configuration in which the insertion portion 312 and a part of the pouch portion 311 are accommodated inside the image forming apparatus 1 may be adopted.

Figure 21:
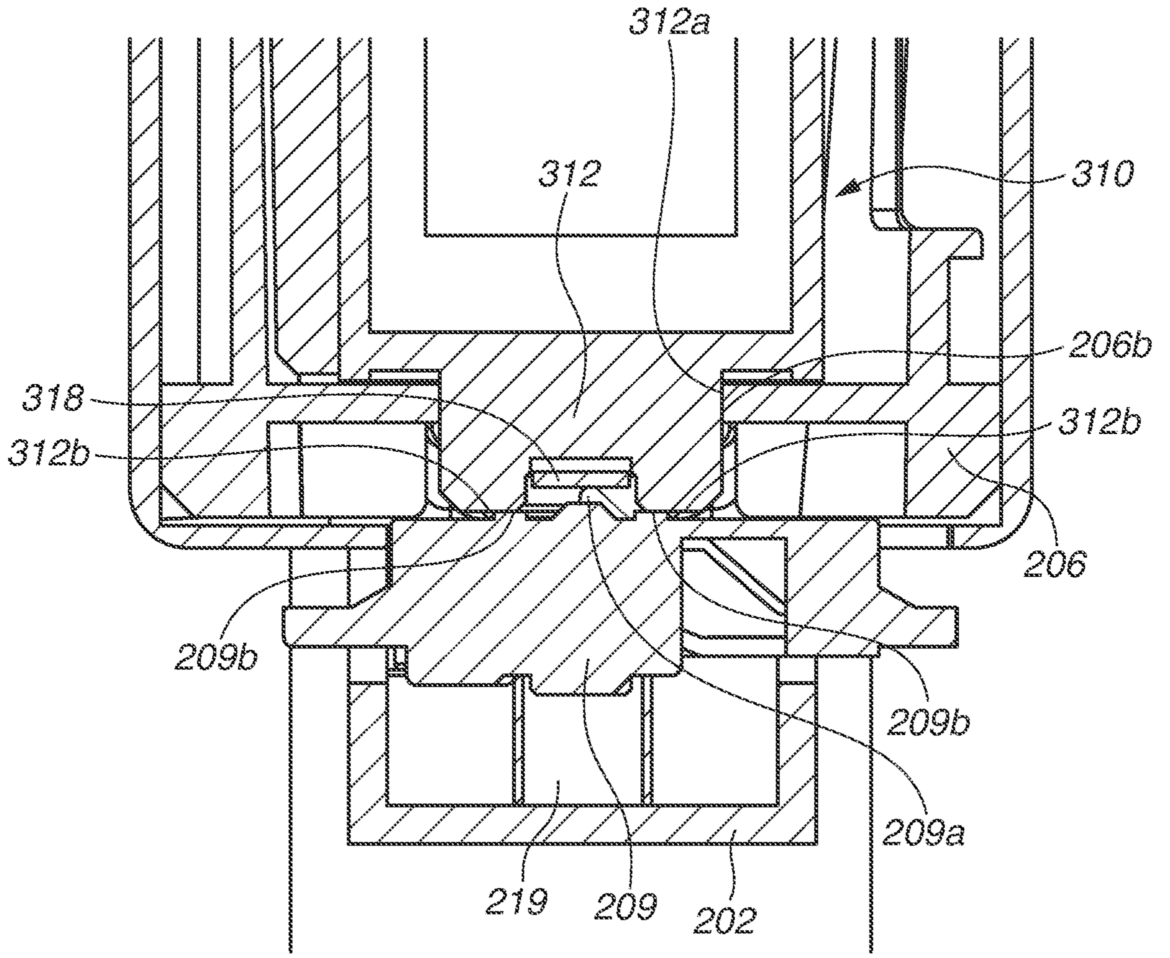
FIG. 21 is a cross-sectional enlarged view illustrating a state in which the replenishment cartridge is attached.

FIG. 21 is a cross-sectional enlarged view illustrating the memory tag 318 in a state where the replenishment pack 310 is attached. While the replenishment pack 310 is being inserted, the side surface of the core positioning rib 312*a* (FIG. 18) arranged on the bottom surface of the insertion portion 312 of the replenishment pack 310 engages with the core positioning hole 206*b* of the main body shutter portion 206, and the core is positioned. Then, the core positioning rib 312*a* of the replenishment pack 310 engages with the communication unit 209, and the electric contact portion 318*a* of the memory tag 318 and the main body electric contact portion 209*a* of the communication unit 209 contact and enter a state in which communication can be electrically performed.

The communication unit 209 is pressed by the pressing member 219 toward the direction of the memory tag 318, and a position in the Z direction is determined by an abutting portion 209*b* of the communication unit 209 abutting an abutting portion 312*b* of the insertion portion 312. In this way, contact pressure of the electric contact portion is ensured.

Figure 22A:
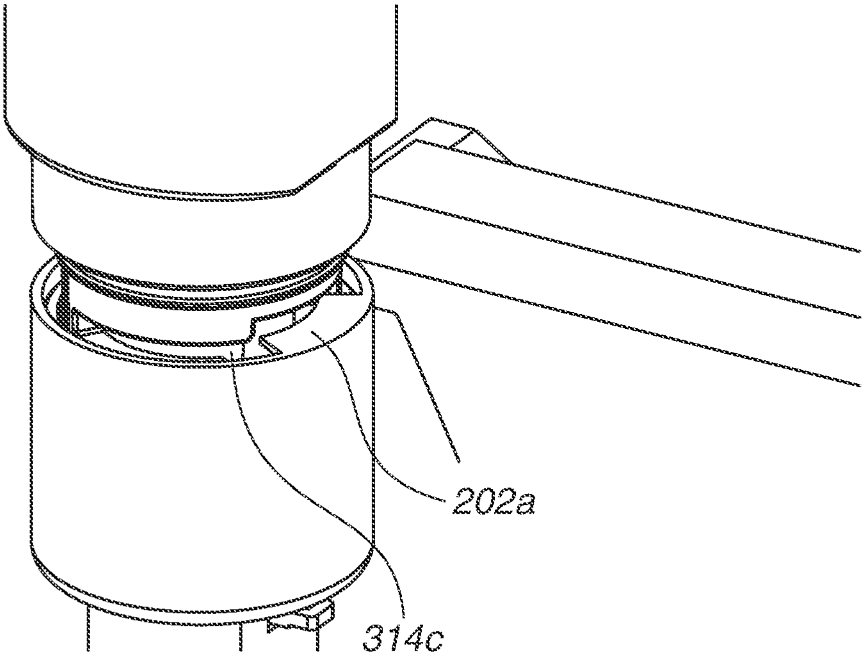
FIG. 22A is a perspective view illustrating a regulation unit.
Figure 22B:
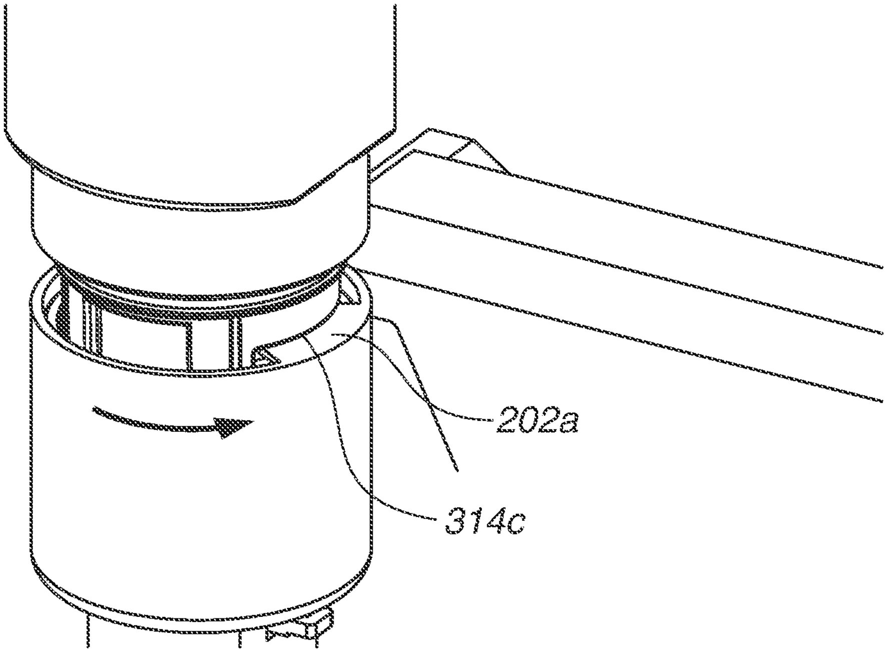
FIG. 22B is a perspective view illustrating a state in which the replenishment cartridge is regulated by the regulation unit in such a manner as not to be detached from the installation portion.

FIGS. 22A and 22B are perspective views illustrating a regulation unit for regulating the detachment of the replenishment pack 310 from the installation portion 200 in a detachment direction. For making the components easily viewable, a part of components such as the operation unit 201 is not displayed.

As illustrated in FIG. 22A, at the default position, the positioning slit portion 314*c* of the replenishment pack 310 and the regulation rib 202*a* of the toner acceptance portion 202 are not engaged, and the replenishment pack 310 is in a state of being detachable from the installation portion 200. On the other hand, as illustrated in FIG. 22B, at the replenishment position, a state in which the regulation rib 202*a* provided on the toner acceptance portion 202 enters the positioning slit portion 314*c* is caused. This state is a state in which the positioning slit portion 314*c* engages with the regulation rib 202*a*, and the replenishment pack 310 is positioned in the Z direction. In other words, this state is a state in which the replenishment pack 310 cannot be detached from the installation portion 200.

In a state where the rotary lever 201*b* is located at the default position, the replenishment pack 310 might be detached from the installation portion 200 while power supply or communication is being performed between the engine controller 130 and the memory tag 318. In a state of being attached to the installation portion 200, the replenishment pack 310 is not accommodated inside the image forming apparatus 1 and the pouch portion 311 of the replenishment pack 310 is visible to the user. Thus, while power supply or communication is being performed between the engine controller 130 and the memory tag 318, the replenishment pack 310 might be detached from the installation portion 200. For example, in a case where authentication of the memory tag 318 is performed as communication between the engine controller 130 and the memory tag 318, the authentication might fail due to the detachment of the replenishment pack 310 from the installation portion 200. By detaching the replenishment pack 310 from the installation portion 200 while communication is being performed between the engine controller 130 and the memory tag 318, the memory tag 318 might be damaged.

The present exemplary embodiment is characterized in that power supply between the memory tag 318 and the engine controller 130 is started after the regulation unit causes a state in which the replenishment pack 310 cannot be detached from the installation portion 200.

As described above, if the rotary lever 201*b* is moved to the replenishment position, the main body shutter portion 206 and the pack shutter portion 314 rotate, and the acceptance opening 205 (FIG. 15) formed on the toner acceptance portion 202 opens. The lateral opening 313 (FIG. 17) formed on the insertion portion 312 is configured to open together with the opening of the acceptance opening 205. Then, the acceptance opening 205 formed on the toner acceptance portion 202 and the lateral opening 313 formed on the insertion portion 312 are in a positional relationship of facing each other when the replenishment pack 310 is inserted into the installation portion 200. Thus, when the rotary lever 201*b* is moved from the default position to the replenishment position, the replenishment pack 310 and the container 18 connect with each other, and toner can be supplied from the replenishment pack 310.

In the present exemplary embodiment, by rotating the rotary lever 201*b* by approximately 90°, the lever detection sensor 225 detects the rotation. Being triggered by the detection, communication of the memory tag 318 is started by the control of the engine controller 130. During the communication, the above-described regulation unit keeps a region in which the replenishment pack 310 is operable with respect to the installation portion 200 within a range in which the communication unit 209 pressed by pressing member 219 can maintain a contact state with the memory tag 318 and can track the memory tag 318. Thus, a contact state between the memory tag 318 and the communication unit 209 is guaranteed, and stable communication can be performed.

Communication between the memory tag 318 and communication unit 209 is performed, and a toner suppliable state is caused. Then, after the completion of toner replenishment, an operation of returning the rotary lever 201*b* to the original default position is performed. At this time, contrary to a lever operation to the replenishment position, first of all, the main body shutter portion 206 of the installation portion 200 and the pack shutter portion 314 of the replenishment pack 310 rotate together, and the acceptance opening 205 and the lateral opening 313 of the respective shutter portions are closed. After that, by returning the rotary lever 201*b* to the default position, engagement between the positioning slit portion 314*c* of the replenishment pack 310 and the regulation rib 202*a* of the toner acceptance portion 202 is released, and the replenishment pack 310 becomes detachable from the installation portion 200. With this configuration, in a case where the replenishment pack 310 is not inserted into the installation portion 200 of the image forming apparatus 1, the main body shutter portion 206 and the pack shutter portion 314 are closed, and leakage of toner can be prevented.

Figure 23:
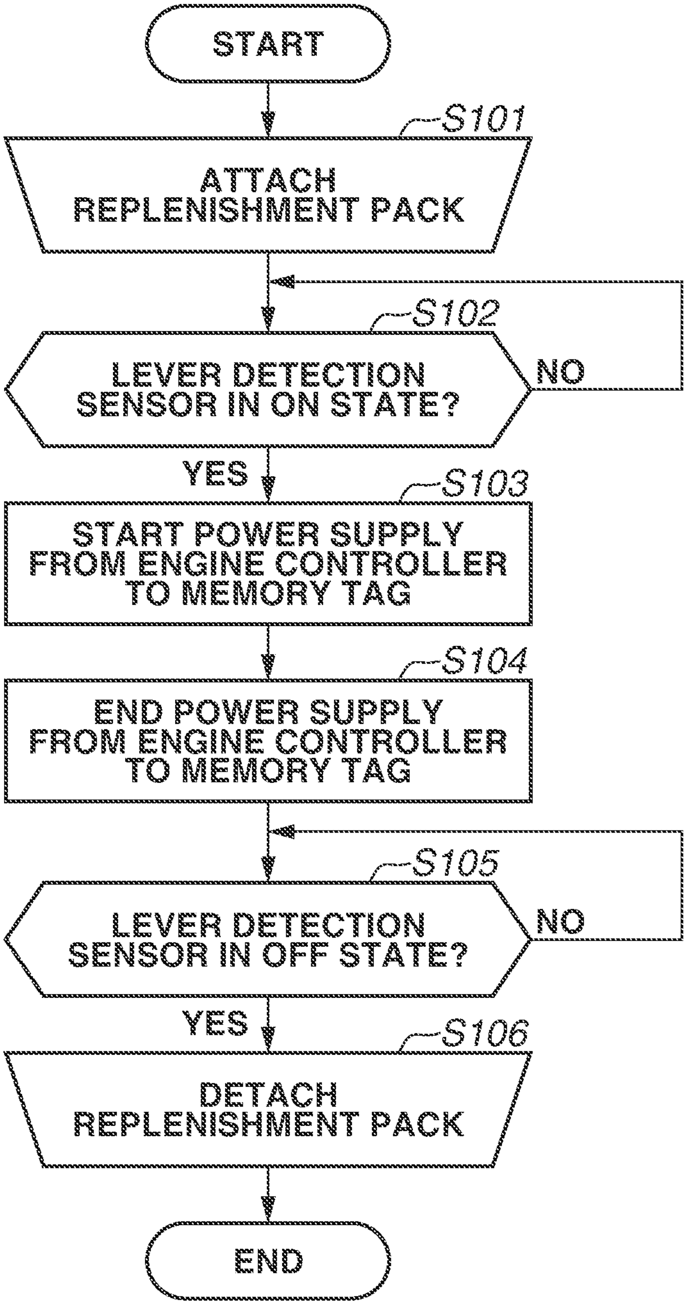
FIG. 23 is a flowchart according to a first exemplary embodiment.

FIG. 23 is a flowchart illustrating a timing of communication between the engine controller 130 and the memory tag 318 according to the present exemplary embodiment.

First of all, when toner is to be supplied, the discharge tray 14 is opened, and the installation portion 200 and the top surface portion 240 provided adjacently to the installation portion 200 are exposed. Then, in step S101, the replenishment pack 310 is attached to the exposed installation portion 200.

In step S102, the engine controller 130 determines whether the lever detection sensor 225 has detected the detected rib portion 201*c* of the operation unit 201. In a case where the lever detection sensor 225 has detected the detected rib portion 201*c* (YES in step S102), the processing proceeds to step S103. In step S103, power supply to the memory tag 318 is started. As described above, a state in which the lever detection sensor 225 has detected the detected rib portion 201*c* of the operation unit 201 is a state in which the replenishment pack 310 is regulated in such a manner as not to be detached from the installation portion 200. Because the replenishment pack 310 is in a state of being regulated in such a manner as not to be detached from the installation portion 200, even when power supply from the engine controller 130 to the memory tag 318 is started, a failure in communication or authentication, and damages to the memory tag 318 can be prevented.

In the present exemplary embodiment, power supply from the engine controller 130 and communication between the memory tag 318 and the engine controller 130 are concurrently performed via the main body electric contact portion 209*a* and the electric contact portion 318*a*. In the present exemplary embodiment, by performing communication between the memory tag 318 and the engine controller 130, an authentication sequence is executed. In the authentication sequence, for example, a lot number of the replenishment pack 310, an amount of stored toner, and characteristic information are read out from the memory tag 318.

When the rotary lever 201*b* is moved from the default position to the replenishment position, the replenishment pack 310 and the container 18 connect with each other, and toner can be supplied from the replenishment pack 310. In the present exemplary embodiment, it becomes possible for the user to perform a toner replenishment operation simultaneously with the authentication sequence. Because the time of the authentication sequence is extremely shorter than a time taken for a replenishment operation, in step S104, the authentication sequence is completed during the replenishment operation, and communication between the engine controller 130 and the memory tag 318 ends.

When the replenishment operation is ended by the user, the user moves the rotary lever 201*b* to the default position. In step S105, it is determined whether the lever detection sensor 225 is in an off state. If the lever detection sensor 225 is in an off state (YES in step S105), power supply from the engine controller 130 to the memory tag 318 has already ended. Thus, the processing proceeds to step S106. In step S106, the replenishment pack 310 is detached from the installation portion 200 while preventing damages to the memory tag 318.

According to the configuration of the present exemplary embodiment, a contact state between the memory tag 318 and the communication unit 209 is guaranteed by the regulation unit, and stable communication can be performed between the memory tag 318 and the engine controller 130.

In the present exemplary embodiment, the description has been given of the configuration in which communication from the engine controller 130 to the memory tag 318 is started at a position at which the rotary lever 201*b* is rotated by approximately 90°. Thus, at a timing at which communication from the engine controller 130 to the memory tag 318 is started, toner replenishment is performed from the replenishment pack 310. In view of the foregoing, by adding a second lever detection sensor 226 in addition to the lever detection sensor 225, communication from the engine controller 130 to the memory tag 318 may be started before the start of toner replenishment from the replenishment pack 310.

Figure 24:
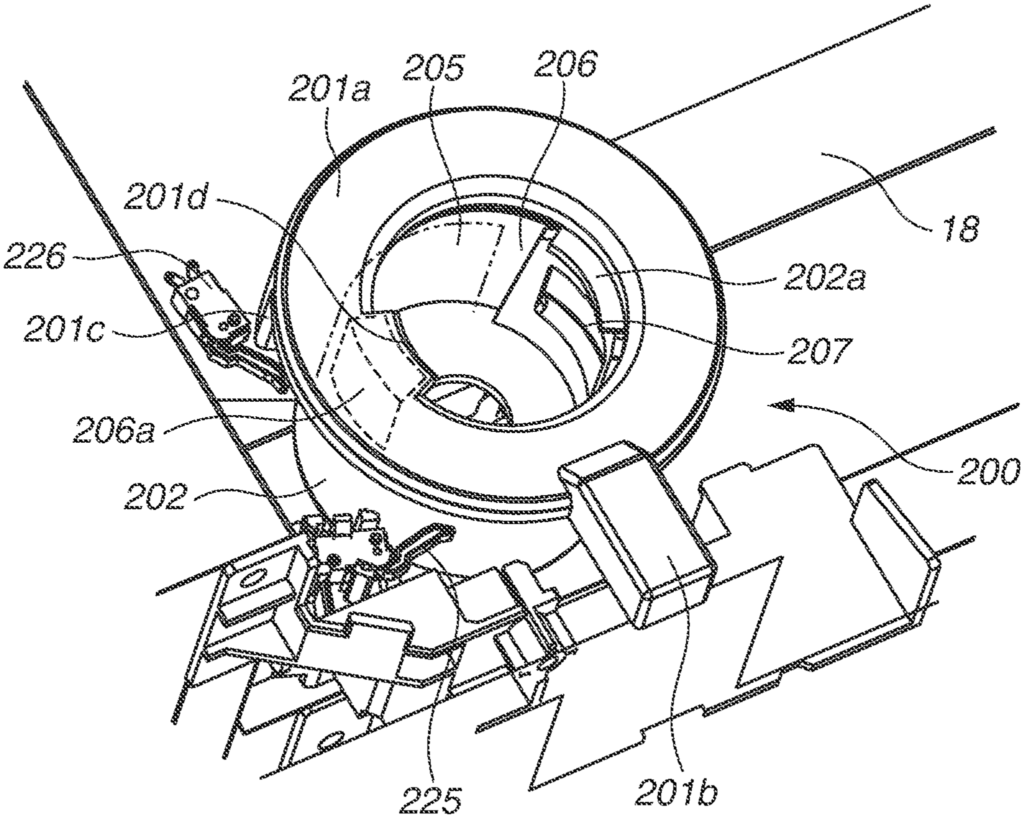
FIG. 24 is a perspective view illustrating a modified example of the first exemplary embodiment.

FIG. 24 is a perspective view illustrating a modified example. The second lever detection sensor 226 serving as a second detection device is arranged at a position at which the second lever detection sensor 226 detects the rotation when the rotary lever 201*b* is rotated from the default position by approximately 10°. The second lever detection sensor 226 is a contact-type sensor similar to the lever detection sensor 225.

Positioning in the Z direction of the replenishment pack 310 is completed when the rotary lever 201*b* is rotated from the default position by approximately 10°. At that timing, the rotation of the rotary lever 201*b* is locked by a certain mechanism (not illustrated) such as a solenoid. If the second lever detection sensor 226 enters an on state in a state where detachment of the replenishment pack 310 is regulated, the engine controller 130 supplies power to the memory tag 318, and starts communication. Then, after the completion of communication, the lock in the rotational direction of the rotary lever 201*b* is canceled and rotated up to 90°. At the position, the rotary lever 201*b* is detected by the lever detection sensor 225, and a toner suppliable state is caused. According to the configuration of the modified example, toner replenishment is not performed until communication is completed, and after the completion of communication, toner replenishment can be started.

In the present exemplary embodiment, the description has been given of the configuration of the regulation unit in which the regulation rib 202*a* of the toner acceptance portion 202 contacts the positioning slit portion 314*c* provided on the pack shutter portion 314, but a slit portion may be provided on the toner acceptance portion 202 side. When the main body shutter portion 206 and the pack shutter portion 314 rotate integrally and reach the second position, a regulation rib provided in the replenishment pack 310 may overlap a slit portion provided in the toner acceptance portion 202.

In the present exemplary embodiment, the regulation in the Z direction of the replenishment pack 310 with respect to the installation portion 200 is performed by an operation of integrally rotating the rotary lever 201*b* and the main body shutter portion 206, which is a movable member, but the operation needs not be a rotating operation. For example, by employing a linearly operated lever as a movable member, and operating the linearly operated lever, the regulation in the Z direction of the replenishment pack 310 with respect to the installation portion 200 may be performed.

In the present exemplary embodiment, the regulation in the Z direction of the replenishment pack 310 with respect to the installation portion 200 is performed in conjunction with a rotational movement of the main body shutter portion 206 and the pack shutter portion 314 used for opening and closing the lateral opening 313, but the regulation needs not be performed in conjunction with the rotational movement. The main body shutter portion 206 and the pack shutter portion 314 may be configured to rotate after the regulation is completed by the regulation unit.

Hereinafter, a second exemplary embodiment will be described. In the second exemplary embodiment, the components having the same or corresponding functions and configurations as those of the first exemplary embodiment are assigned the same reference numerals, and the redundant description will be omitted.

In the first exemplary embodiment, the description has been given of a configuration of preventing detachment of the replenishment pack 310 and opening and closing the shutter of the replenishment pack 310 by rotating the rotary lever 201*b* provided in the operation unit 201. In the present exemplary embodiment, the description will be given of a configuration of preventing detachment of the replenishment pack 310 and opening and closing the shutter of the replenishment pack 310 in a configuration not having the operation unit 201.

Figure 25:
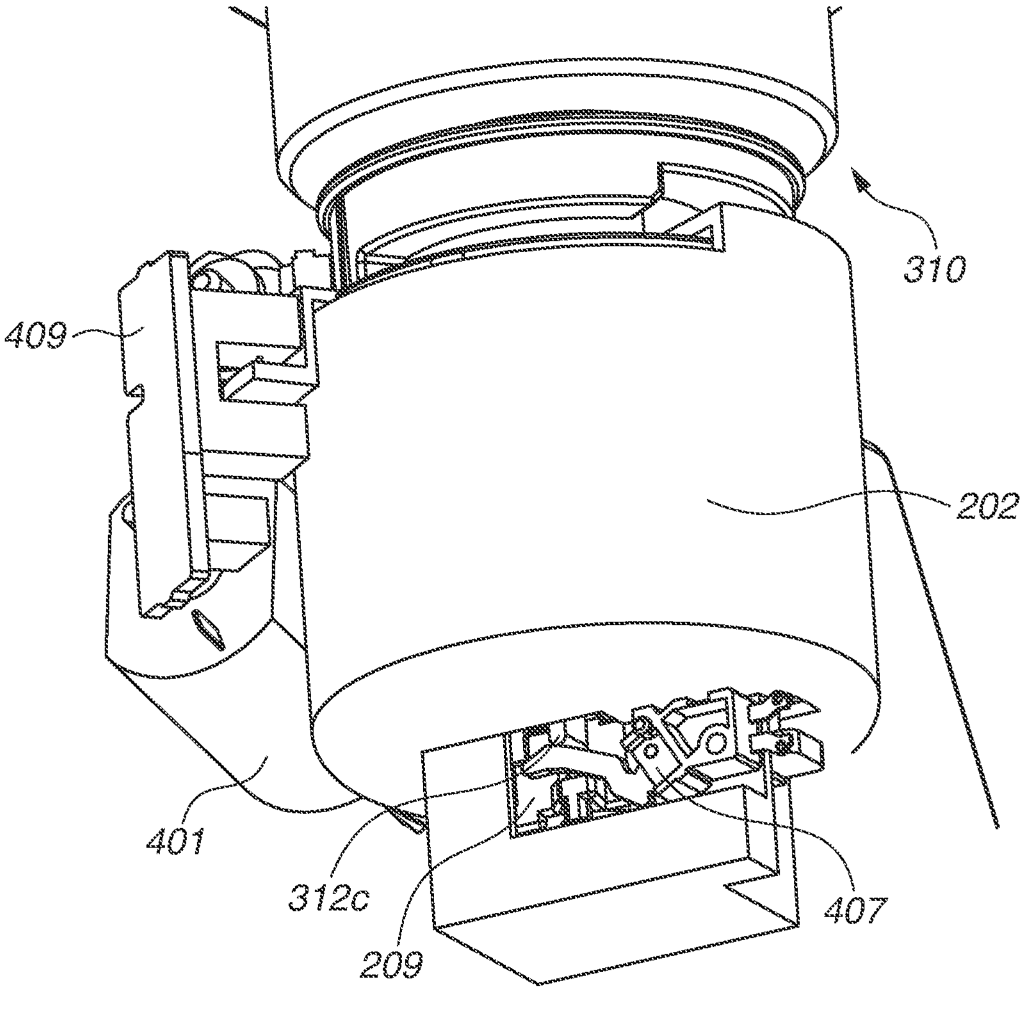
FIG. 25 is a perspective view illustrating a configuration according to a second exemplary embodiment.

The configuration of the second exemplary embodiment will be described with reference to FIGS. 25 to 29. For making functional components easily viewable, a part of holding members is not illustrated. As illustrated in FIG. 25, in parallel to the communication unit 209 arranged similarly to the first exemplary embodiment, an installation detection sensor 407 serving as an installation detection means for detecting the installation of the replenishment pack 310 is arranged on the bottom surface of a replenishment unit. The installation detection sensor 407 is a contact-type sensor, but may be a contactless sensor.

Figure 26:
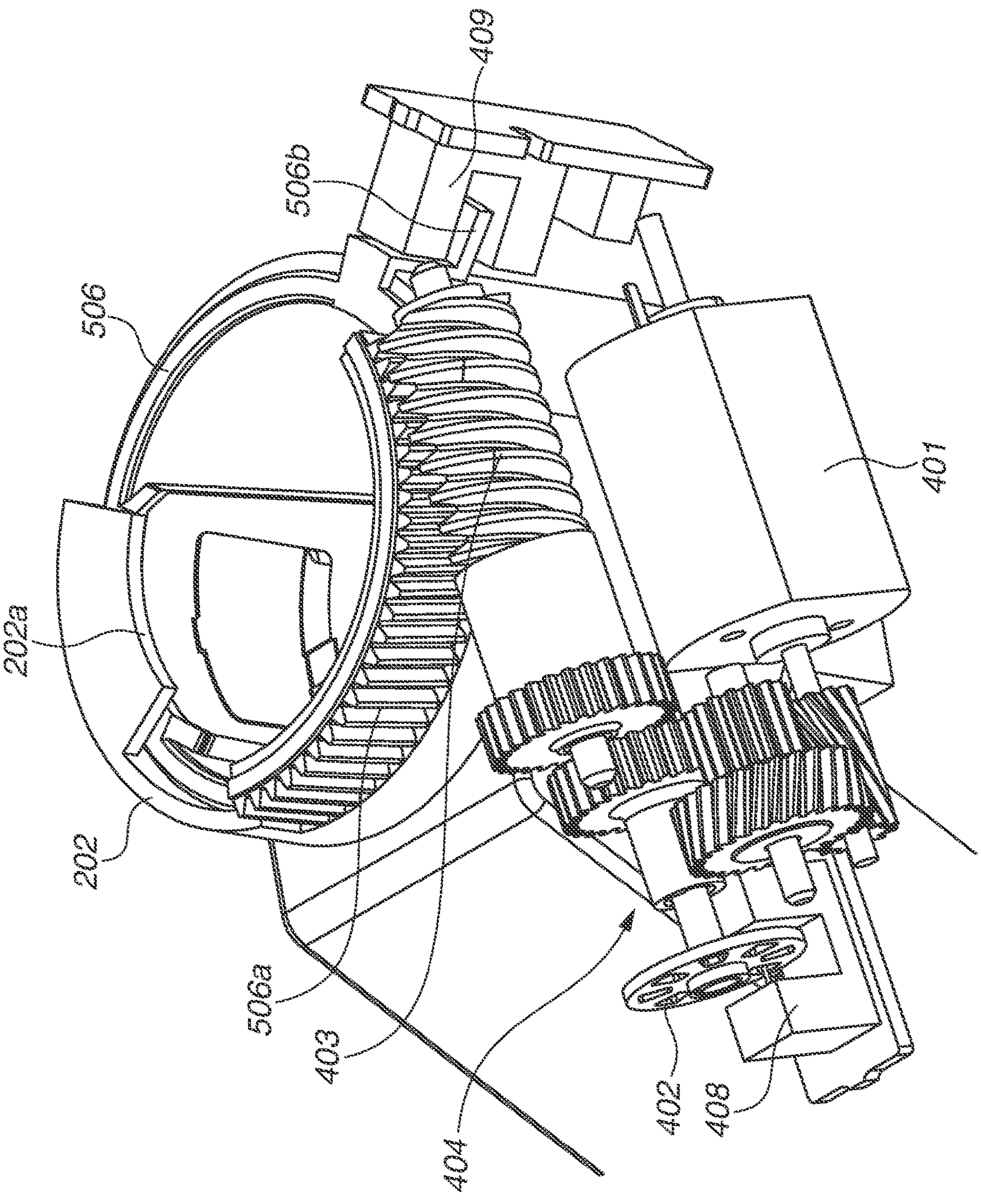
FIG. 26 is a perspective view illustrating a configuration according to the second exemplary embodiment.

As illustrated in FIG. 26, a main body shutter portion 506 includes a worm wheel portion 506*a*, and drive force can be transmitted from a brush motor 401 via a gear train portion 404, including a plurality of gears, and a worm gear 403. In the present exemplary embodiment, the main body shutter portion 506 serves as a movable member provided in the regulation unit, or the main body shutter portion 506 also serves as a second rotary member.

In the present exemplary embodiment, the regulation unit includes the regulation rib 202*a* of the toner acceptance portion 202 and the main body shutter portion 506 that moves the pack shutter portion 314.

An encoder 402 and a rotation detection sensor 408 arranged inside a drive train are provided for performing rotation control of the brush motor 401. A second detection device that detects the number of rotations of the brush motor 401 includes the encoder 402 and the rotation detection sensor 408. Furthermore, a position detection sensor 409 (first detection device in the second exemplary embodiment) for detecting a rotational position of the main body shutter portion 506 is included. The main body shutter portion 506 includes a position detection rib 506*b*.

Figure 27:
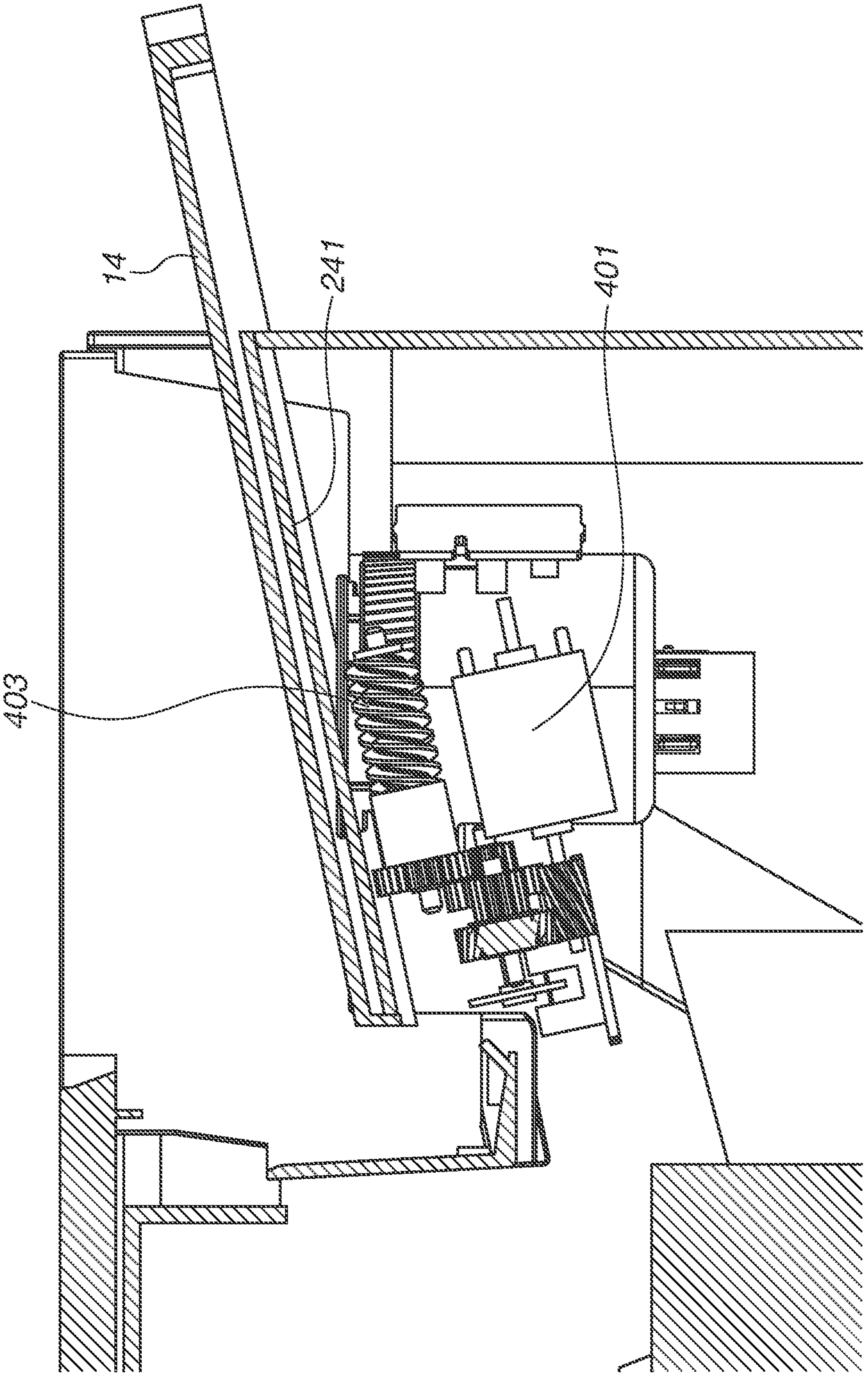
FIG. 27 is a cross-sectional view according to the second exemplary embodiment.

As illustrated in FIG. 27, drive force transmission components such as a top surface portion 241 and the worm gear 403 are arranged so as to extend along the angle of the discharge tray 14. By obliquely arranging the worm gear 403 so as to extend along the top surface portion 241, it becomes possible to fit almost all the drive force transmission components within a width in the height direction of the installation portion 200, and this contributes to the downsizing of the image forming apparatus.

Figure 28:
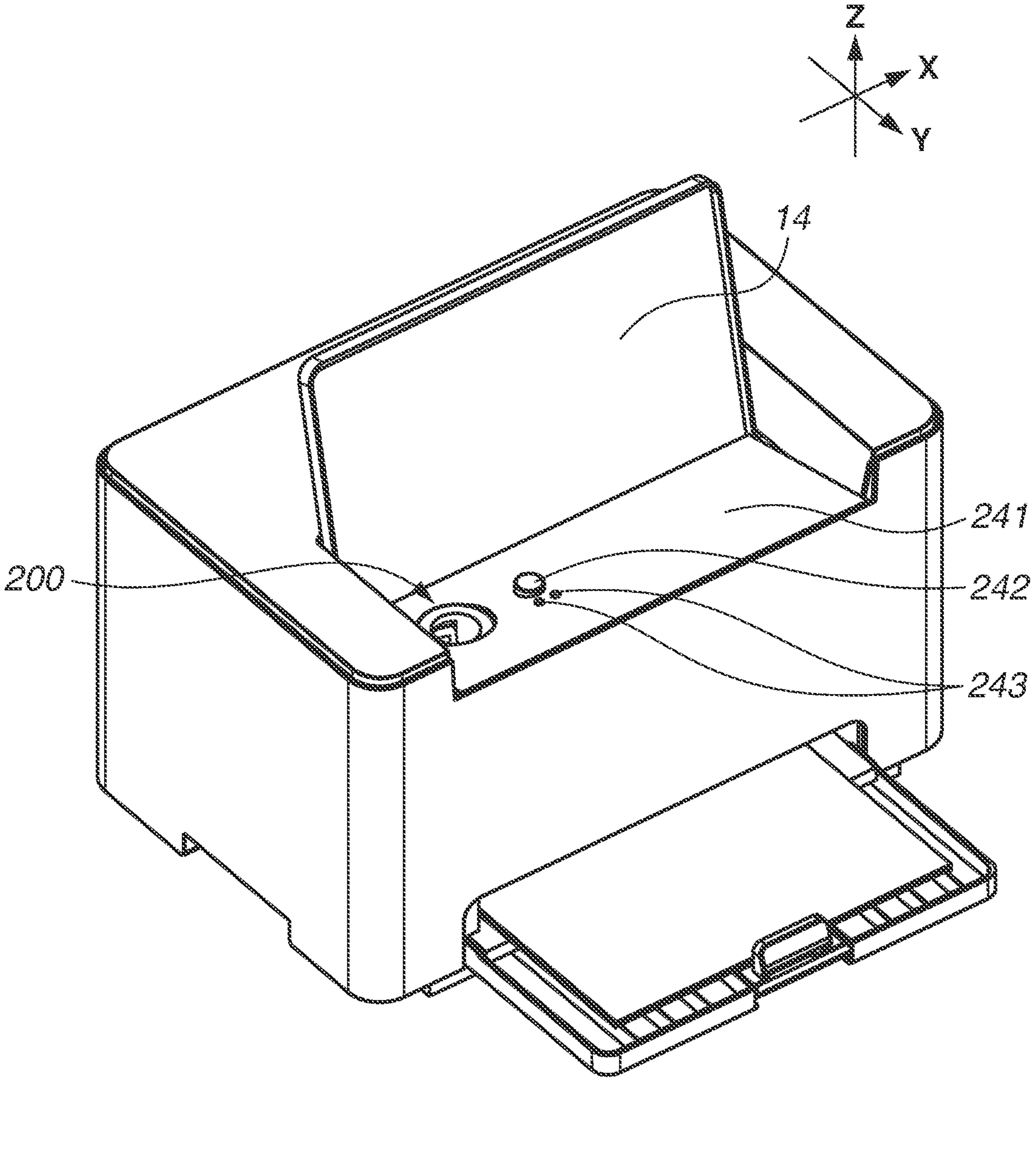
FIG. 28 is a perspective view illustrating a state in which a discharge tray according to the second exemplary embodiment is opened.

As illustrated in a perspective view in FIG. 28, a detachment button 242 to be used by the user for detaching the replenishment pack 310 from the installation portion 200 after the completion of toner replenishment performed by the user is provided on the right side of the installation portion 200 of the top surface portion 241. Light-emitting diode (LED) lamps 242 and 243 for notifying the user of a state during a replenishment operation are also provided on the right side of the installation portion 200 of the top surface portion 241. The detachment button 242 and the LED lamps 243 are connected to the engine controller 130.

A toner replenishment operation according to the present exemplary embodiment, and operations of power supply and communication between the engine controller 130 and the memory tag 318 will be described with reference to a cross-sectional view in FIG. 29 and perspective views in FIGS. 30A to 30C.

Figure 30A:
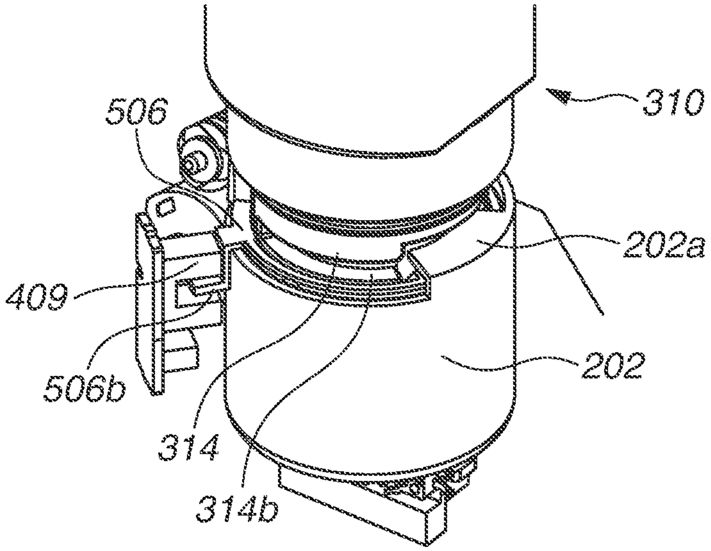
FIG. 30A is a perspective view illustrating a regulation unit.
Figure 30B:
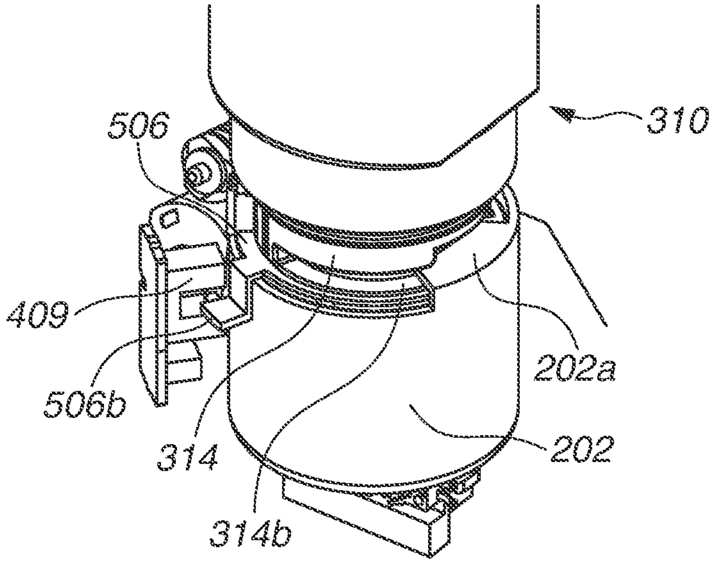
FIG. 30B is a perspective view illustrating the regulation unit.

FIG. 30A illustrates a position in a state where the replenishment pack 310 is attached to the installation portion 200, and FIG. 30B illustrates a position in a state where the replenishment pack 310 is regulated in such a manner as not to be detached from the installation portion 200. In the present exemplary embodiment, in the state in FIG. 30B, the engine controller 130 supplies power to the memory tag 318 and communicates with the memory tag 318. FIG. 30C illustrates a position at which toner replenishment can be performed from the replenishment pack 310.

In a state before the replenishment pack 310 is inserted, the installation detection sensor 407 is in an OFF state and the position detection sensor 409 is in an ON state.

Figure 29:
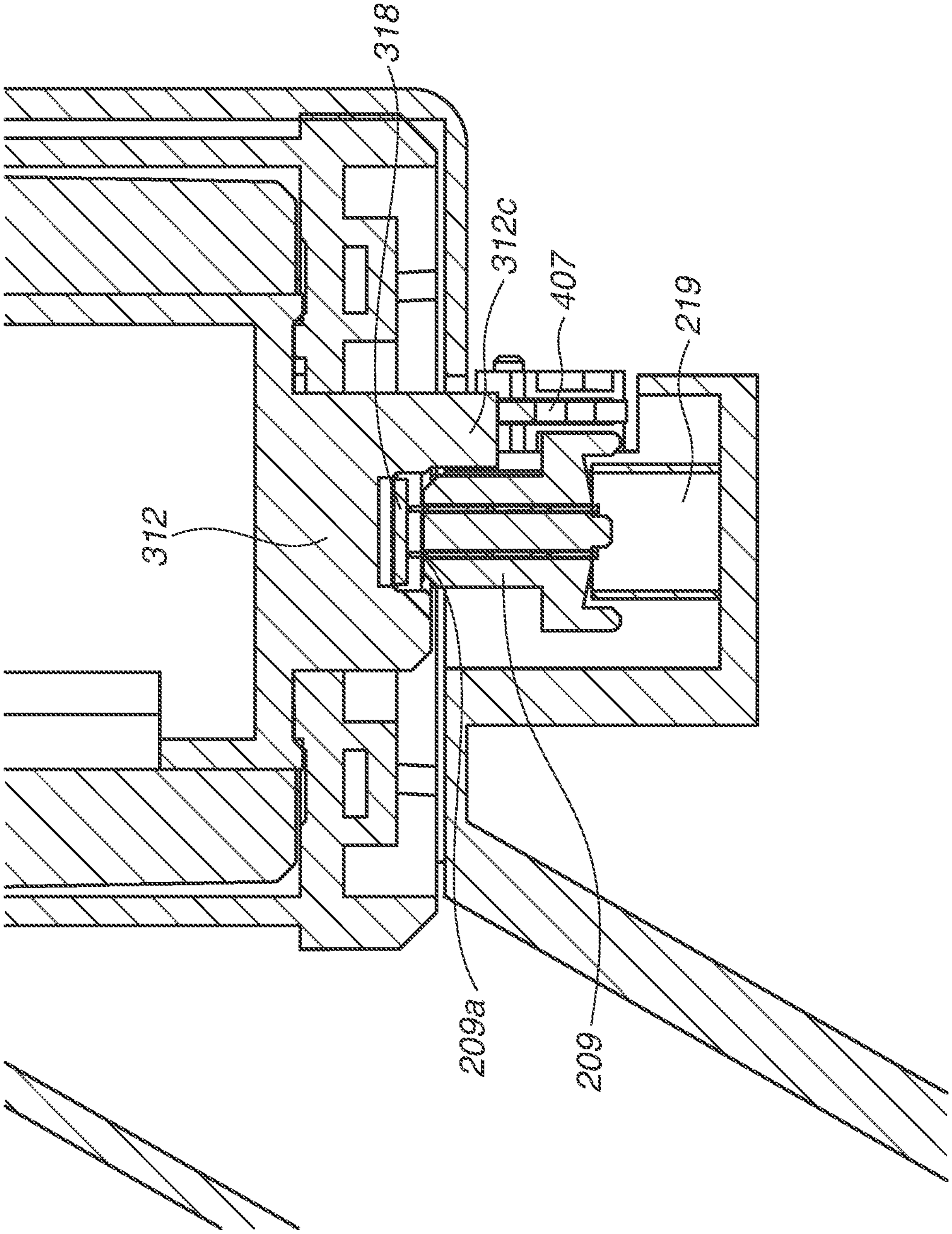
FIG. 29 is a cross-sectional enlarged view illustrating a state in which a replenishment cartridge is attached.

As illustrated in FIG. 29, when the replenishment pack 310 is inserted into the replenishment unit 300, the electric contact portion 318*a* of the memory tag 318 on the replenishment pack bottom surface and the main body electric contact portion 209*a* of the communication unit 209 contact, and the installation detection sensor 407 is switched from OFF to ON by an installation detection rib 312*c* provided on the insertion portion 312 of the replenishment pack 310 (FIG. 30A).

As a result, the brush motor 401 starts to be driven to rotate in a positive direction. A drive force transmission rib (first engagement portion) of the main body shutter portion 506 and a drive force transmitted rib (second engagement portion) of the pack shutter portion 314 engage with each other when the replenishment pack 310 is attached, and drive force transmission can be performed. Thus, the main body shutter portion 506 rotates integrally with the pack shutter portion 314.

In the present exemplary embodiment, when the position detection sensor 409 is in an ON state, the main body shutter portion 506 is located at the first position (default position).

When the position detection sensor 409 switches from ON to OFF at the position of approximately 5° from the default position, the engine controller 130 reads a signal of the rotation detection sensor 408, and stops the brush motor 401 at the position at which the main body shutter portion 506 is rotated by approximately 10° (FIG. 30B). At the position at which the main body shutter portion 506 is rotated from the default position by approximately 5°, the regulation rib 202*a* in the Z direction provided on the toner acceptance portion 202 enters the positioning slit portion 314*c* provided on the pack shutter portion 314. In other words, it is a state where the replenishment pack 310 is regulated by the regulation unit in such a manner as not to be detached from the installation portion 200. In the present exemplary embodiment, the position at which the main body shutter portion 506 is rotated by approximately 5° is a regulation position, and serves as the second position.

The engine controller 130 starts power supply to the memory tag 318 in this state and communicates with the memory tag 318. During the communication, a region in which the replenishment pack 310 is operable with respect to the installation portion 200 falls within a range in which the communication unit 209 pressed by pressing member 219 can maintain a contact state with the memory tag 318 and can track the memory tag 318. Thus, a contact state between the memory tag 318 and the communication unit 209 is guaranteed, and stable communication can be performed. At this stage, because the lateral opening 313 for toner replenishment is not open, toner replenishment is not performed.

Figure 30C:
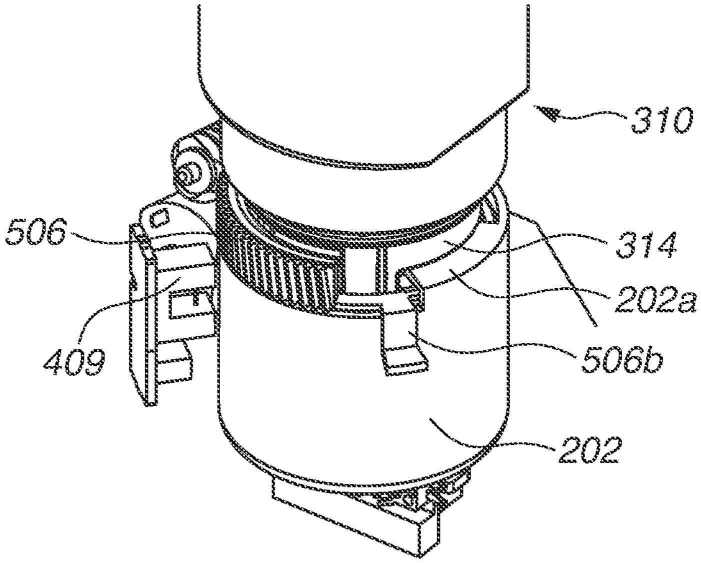
FIG. 30C is a perspective view illustrating a state in which the replenishment cartridge is regulated by the regulation unit in such a manner as not to be detached from an installation portion.

In a case where communication has succeeded, the engine controller 130 again drives the brush motor 401 to rotate in the position direction, and stops the brush motor 401 at the replenishment position at which the main body shutter portion 506 is rotated from the default position by approximately 90° (FIG. 30C). In the present exemplary embodiment, a position at which the main body shutter portion 506 is rotated by about 90° is the replenishment position, and also serves as a third position.

At the third position, the replenishment pack 310, the installation portion 200, and the container 18 connect with each other, and toner replenishment can be performed. Then, when replenishment is completed by a replenishment operation performed by the user, by the user operating the detachment button 242, the brush motor 401 is rotated inversely, and rotates the main body shutter portion 506 up to the default position. It thereby becomes possible for the user to detach the replenishment pack 310. A toner replenishment procedure and a communication procedure of the memory tag 318 according to the present exemplary embodiment have been described above.

In a case where the engine controller 130 performs communication with the memory tag 318 in the state illustrated in FIG. 30B, and the communication fails, the main body shutter portion 506 is not shifted to the replenishment position (FIG. 30C), the brush motor 401 is rotated inversely, and the main body shutter portion 506 is shifted to the default position (FIG. 30A) at which the replenishment pack 310 is detachable. A failure in communication between the engine controller 130 and the memory tag 318 according to the present exemplary embodiment includes communication being unestablished due to a contact failure between the electric contact portion 318*a* of the memory tag 318 and the main body electric contact portion 209*a* of the communication unit 209. A failure in communication between the engine controller 130 and the memory tag 318 also includes a failure in authentication in the authentication sequence between the engine controller 130 and the memory tag 318.

For example, the authentication sequence is a sequence for determining whether a presupposed replenishment pack 310 is attached to the image forming apparatus 1 by exchanging information between the engine controller 130 and the memory tag 318. For example, if the user erroneously attaches a replenishment pack storing yellow toner to the image forming apparatus 1 supposed to use black toner as toner to be supplied, and the container 18 of the image forming apparatus 1 is replenished with yellow toner, black toner and yellow toner are mixed within the container 18, which may cause a disadvantage to the user. Thus, in the authentication sequence, in a case where the engine controller 130 of the image forming apparatus 1 determines that the attached replenishment pack 310 is not a replenishment pack storing toner with expected color, the engine controller 130 may determine the authentication to be a failure, and rotate the brush motor 401 inversely.

Figure 31:
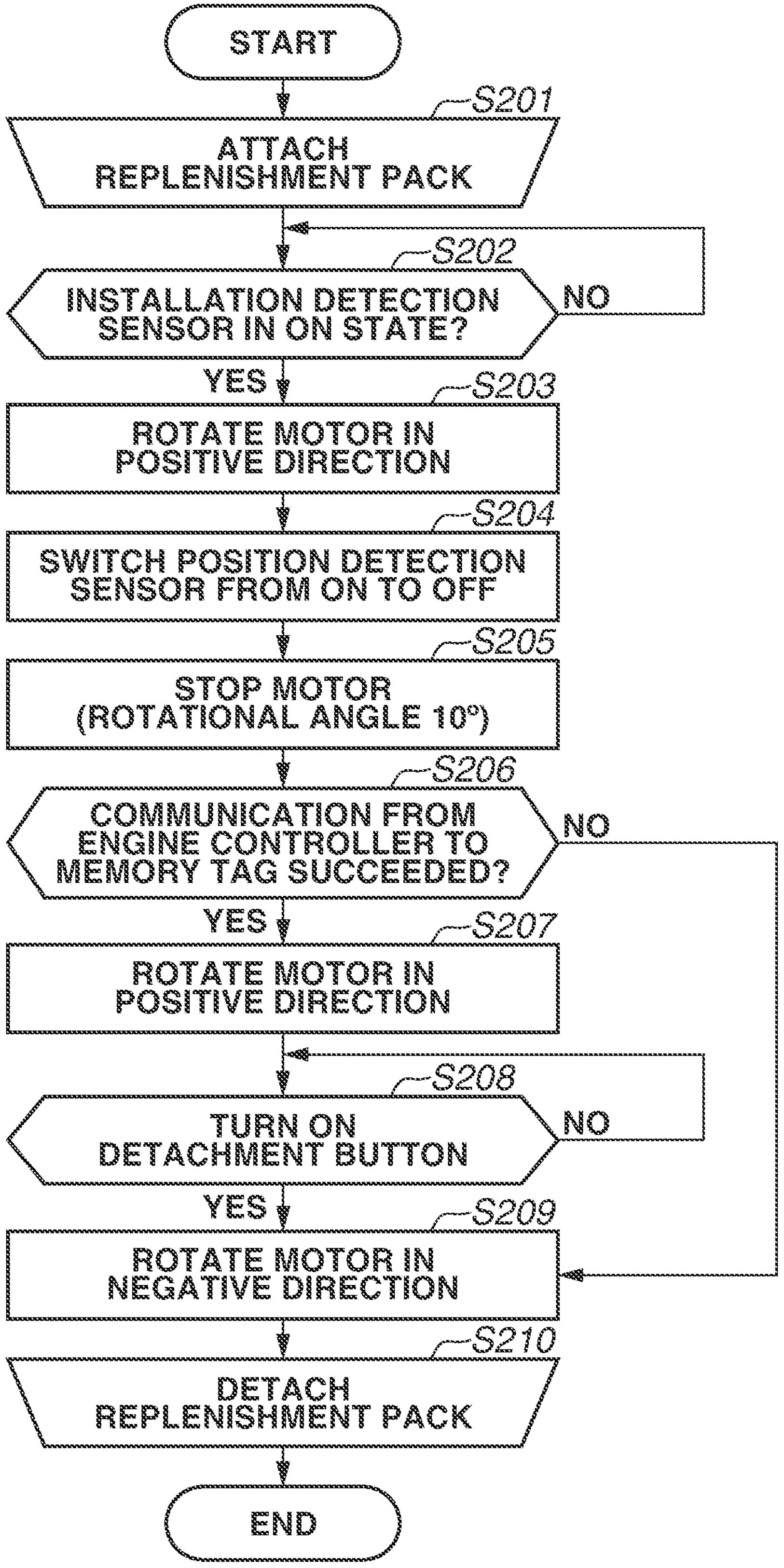
FIG. 31 is a flowchart according to the second exemplary embodiment.

FIG. 31 is a flowchart illustrating a timing of communication between the engine controller 130 and the memory tag 318 according to the present exemplary embodiment. First of all, when toner replenishment is to be performed, the discharge tray 14 is opened, and the installation portion 200 and the top surface portion 241 provided adjacently to the installation portion 200 are exposed. In a state where the top surface portion 241 is exposed, the LED lamp 242 may be lit up in green.

Then, in step S201, the replenishment pack 310 is attached to the exposed installation portion 200.

In step S202, the engine controller 130 determines whether the installation detection sensor 407 is switched to ON by the installation detection rib 312*c* of the replenishment pack 310. In a case where it is determined that the installation detection sensor 407 is switched to ON (YES in step S202), the processing proceeds to step S203. In step S203, the brush motor 401 is rotated in a positive direction. While the brush motor 401 is rotating in the positive direction, the LED lamp 243 may be lit up in red.

In step S204, the position detection sensor 409 switches from ON to OFF by the rotation of the main body shutter portion 506. After that, in step S205, the engine controller 130 reads a signal of the rotation detection sensor 408, and stops the brush motor 401 at the position at which the main body shutter portion 506 is rotated by approximately 10°. A state in which the brush motor 401 is stopped is a state in which the replenishment pack 310 is regulated in such a manner as not to be detached from the installation portion 200. Because the replenishment pack 310 is in a state of being regulated in such a manner as not to be detached from the installation portion 200, communication from the engine controller 130 to the memory tag 318 is started. While communication is being performed from the engine controller 130 to the memory tag 318, or when the rotation of the brush motor 401 is stopped, the LED lamp 243 may be lit up in red. At the position at which the main body shutter portion 506 is rotated by approximately 10°, the lateral opening 313 of the replenishment pack 310 is closed by the pack shutter portion 314. Thus, toner replenishment is not performed.

In step S206, it is determined whether communication from the engine controller 130 to the memory tag 318 has succeeded. In a case where the communication has succeeded (YES in step S206), the processing proceeds to step S207. In step S207, communication from the engine controller 130 to the memory tag 318 is ended.

After that, the engine controller 130 drives the brush motor 401 to rotate in the positive direction again, and stops the brush motor 401 at the replenishment position at which the main body shutter portion 506 is rotated from the default position by approximately 90°.

In this state, the replenishment pack 310 and the container 18 are connected, and toner replenishment from the replenishment pack 310 can be performed.

In step S208, it is determined whether the user has operated the detachment button 242. In a case where the detachment button 242 is turned on (YES in step S208), the processing proceeds to step S209. In step S209, the engine controller 130 rotates the brush motor 401 in a negative direction, and rotates the main body shutter portion 506 up to the default position. While the brush motor 401 is rotating in the negative direction, the LED lamp 243 may be lit up in red. Alternatively, if the position detection sensor 409 switches from OFF to ON by the negative rotation of the main body shutter portion 506, the LED lamp 242 may be lit up in green. The LED lamps 242 and 243 may be lit up or blinked in accordance with the phase of the main body shutter portion 506 as in the present exemplary embodiment. Alternatively, for example, the LED lamps 242 and 243 may be lit up or blinked in accordance with a timing of communication from the engine controller 130 to the memory tag 318. Then, in step S210, the replenishment pack 310 is detached from the installation portion 200.

Also in the present exemplary embodiment, a contact state between the memory tag 318 and the communication unit 209 is guaranteed by the regulation unit, and stable communication can be performed between the memory tag 318 and the engine controller 130.

While the present disclosure has been described with reference to exemplary embodiments, it is to be understood that the disclosure is not limited to the disclosed exemplary embodiments. The scope of the following claims is to be accorded the broadest interpretation so as to encompass all such modifications and equivalent structures and functions.

What is claimed is:

1. An image forming apparatus to which a replenishment cartridge including a storing unit storing toner and a memory device storing information is attachable, the image forming apparatus comprising:

- an installation portion to which the replenishment cartridge is attached;
- a cover portion movable between (i) a cover position in which the cover portion covers the installation portion and (ii) an exposing position in which the installation portion is exposed;
- a first electric contact portion provided inside the installation portion and configured to contact a second electric contact portion of the memory device included in the replenishment cartridge in a state where the replenishment cartridge is attached to the installation portion;
- a regulation unit that includes a movable member movable from a first position to a second position and is configured to regulate the replenishment cartridge so as not to be detached from the installation portion in a case where the movable member is in the second position; and
- a control unit,
- wherein the regulation unit regulates the replenishment cartridge so as not to be detached from the installation portion, in a state where the cover portion is in the exposing position, by the movable member moving from the first position to the second position, and
- wherein the control unit is configured to start communication with the memory device via the first electric contact portion and the second electric contact portion after the replenishment cartridge is regulated in the installation portion by the regulation unit in the state where the cover portion is in the exposing position.

2. The image forming apparatus according to claim 1, wherein the installation portion includes an operation unit including a rotatable grip member.

3. The image forming apparatus according to claim 2, wherein the movable member rotates from the first position to the second position by rotating the operation unit.

4. The image forming apparatus according to claim 1, further comprising a drive source, wherein the movable member is rotated by the drive source from the first position to the second position.

5. The image forming apparatus according to claim 1, wherein the first electric contact portion faces toward an upside of the image forming apparatus.

6. The image forming apparatus according to claim 5, further comprising a pressing member configured to press the first electric contact portion toward the upside.

7. The image forming apparatus according to claim 1, further comprising:

- a sensor, wherein output of the sensor differs between a case where the movable member is in the first position and a case where the movable member is in the second position,
- wherein the control unit is configured to start communication after the movable member moves from the first position to the second position so that the output of the sensor varies.

8. The image forming apparatus according to claim 1, wherein the first electric contact portion faces toward an upstream side with respect to an attachment direction of the replenishment cartridge.

* * * * *